US010805662B2

United States Patent
Chu et al.

(10) Patent No.: US 10,805,662 B2
(45) Date of Patent: *Oct. 13, 2020

(54) PREDICTIVE SERVER-SIDE RENDERING OF SCENES

(71) Applicant: Microsoft Technology Licensing, LLC, Redmond, WA (US)

(72) Inventors: David Chiyuan Chu, Kirkland, WA (US); Eduardo Alberto Cuervo Laffaye, Bellevue, WA (US); Johannes Peter Kopf, Hamburg (DE); Alastair Wolman, Seattle, WA (US); Yury Degtyarev, Saint Petersburg (RU); Kyungmin Lee, Ann Arbor, MI (US); Sergey Grizan, Krasnoyarsk (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,241

(22) Filed: Nov. 25, 2019

(65) Prior Publication Data
US 2020/0092599 A1 Mar. 19, 2020

Related U.S. Application Data

(63) Continuation of application No. 15/691,608, filed on Aug. 30, 2017, now Pat. No. 10,491,941, which is a continuation of application No. 14/603,213, filed on Jan. 22, 2015, now Pat. No. 9,756,375.

(51) Int. Cl.
*G06T 11/20* (2006.01)
*H04N 21/426* (2011.01)
*A63F 13/35* (2014.01)
*G06T 15/20* (2011.01)
*H04L 29/08* (2006.01)

(52) U.S. Cl.
CPC ....... *H04N 21/42653* (2013.01); *A63F 13/35* (2014.09); *G06T 15/20* (2013.01); *H04L 67/36* (2013.01)

(58) Field of Classification Search
None
See application file for complete search history.

(56) References Cited

U.S. PATENT DOCUMENTS

2009/0058813 A1* 3/2009 Rubanovich .......... G06F 3/0237
345/169

* cited by examiner

*Primary Examiner* — Anh-Tuan V Nguyen
(74) *Attorney, Agent, or Firm* — Alleman Hall Creasman & Tuttle LLP

(57) ABSTRACT

A server device and method are provided for use in predictive server-side rendering of scenes based on client-side user input. The server device may include a processor and a storage device holding instructions for an application program executable by the processor to receive, at the application program, a current navigation input in a stream of navigation inputs from a client device over a network, calculate a predicted future navigation input based on the current navigation input and a current application state of the application program, render a future scene based on the predicted future navigation input to a rendering surface, and send the rendering surface to the client device over the network.

20 Claims, 19 Drawing Sheets

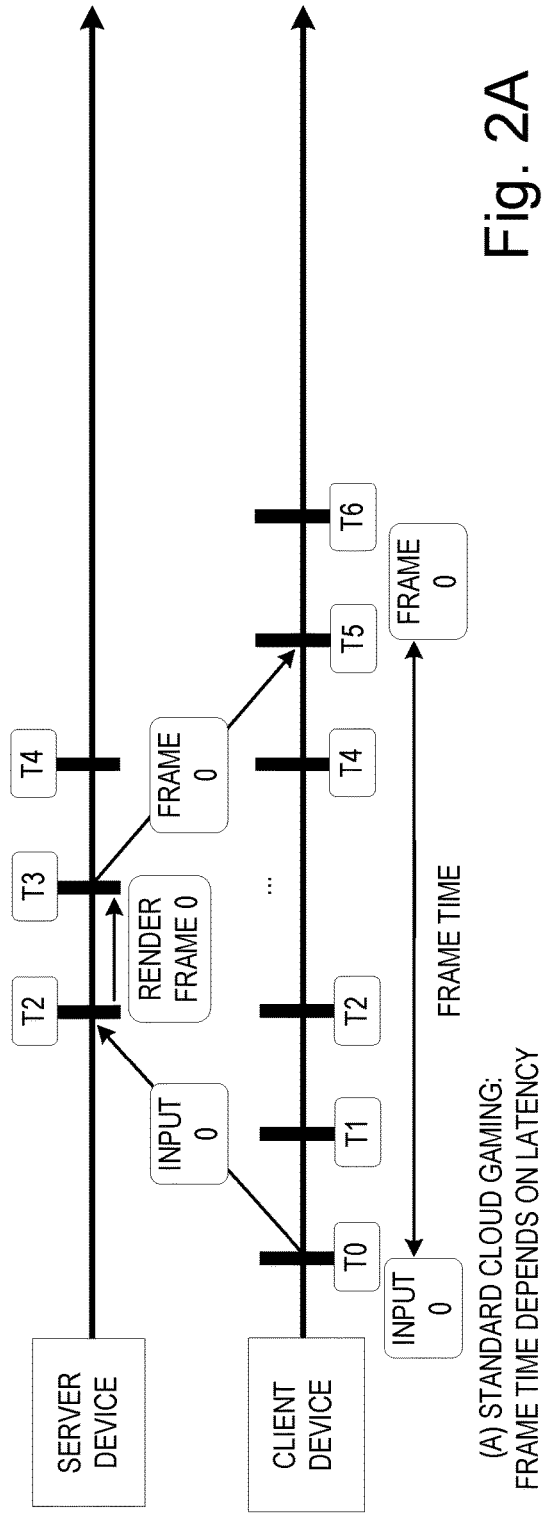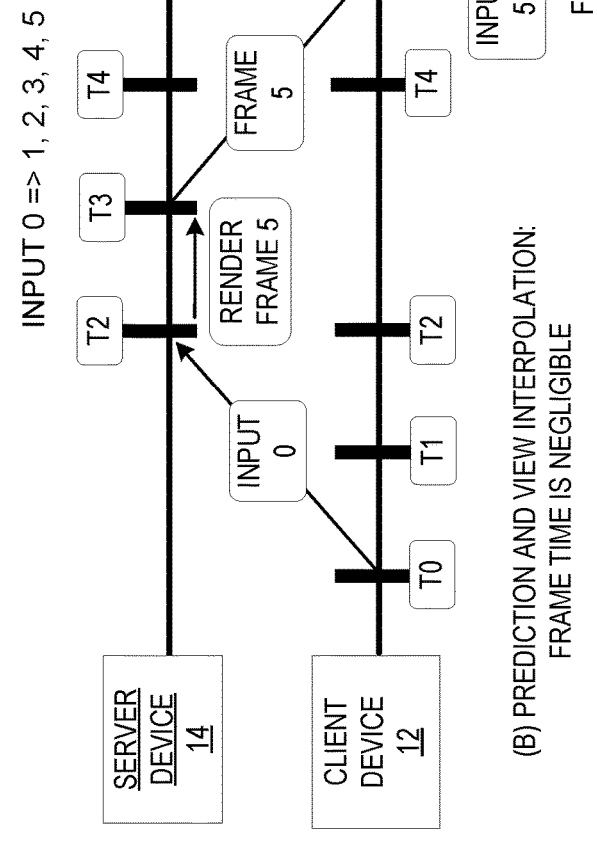

CUBEMAP

CLIPPED CUBEMAP

PREDICTED USER ORIENTATION

ACTUAL USER ORIENTATION

RENDERED EDGE
RENDERING SURFACES
WITH WIDER FIELD OF
VIEW

RENDERED EDGE
RENDERING SURFACES
WITH WIDER FIELD OF
VIEW

PREDICTED USER ORIENTATION

RENDERED EDGE
RENDERING SURFACES
WITH WIDER FIELD OF
VIEW

ACTUAL USER ORIENTATION

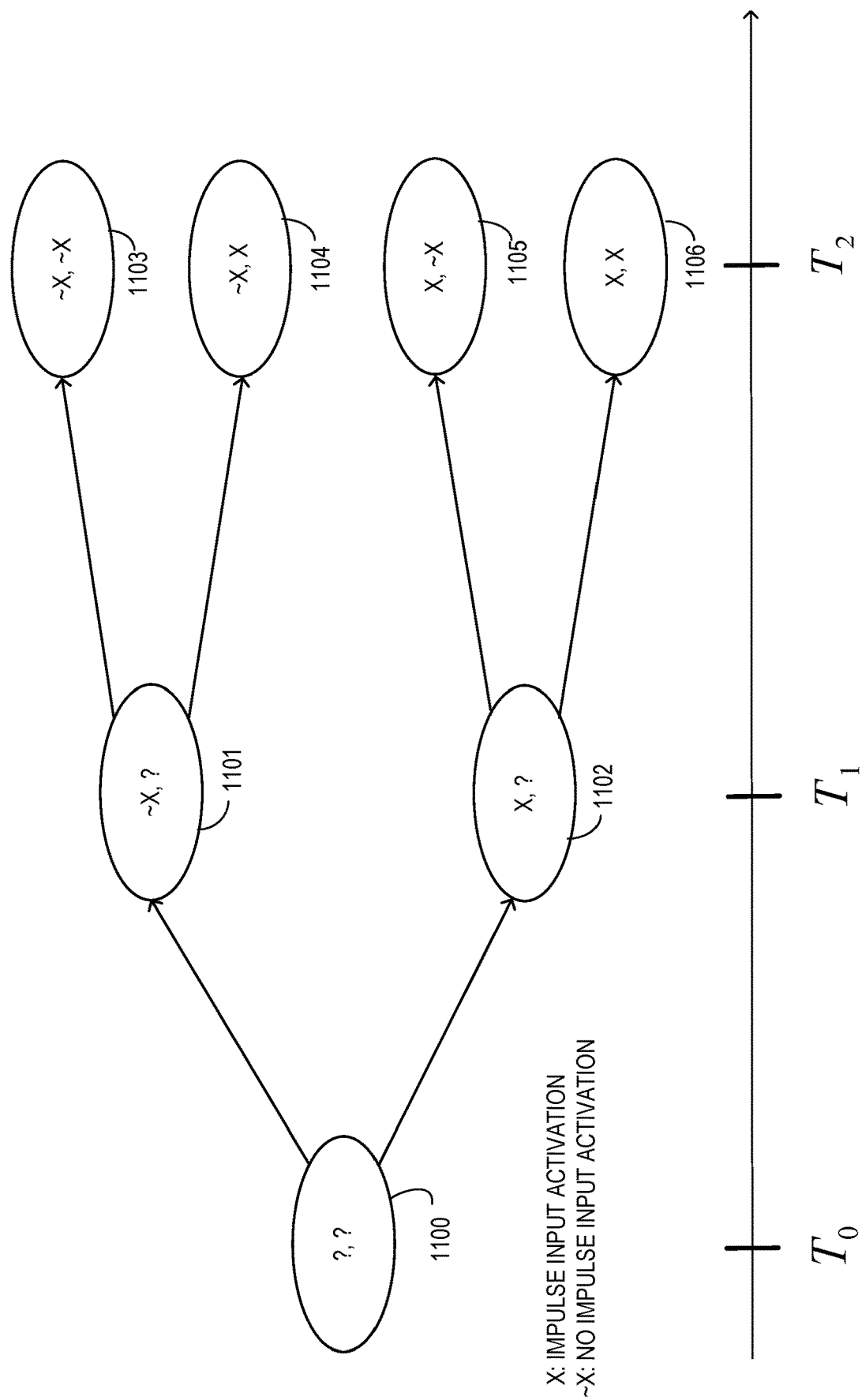

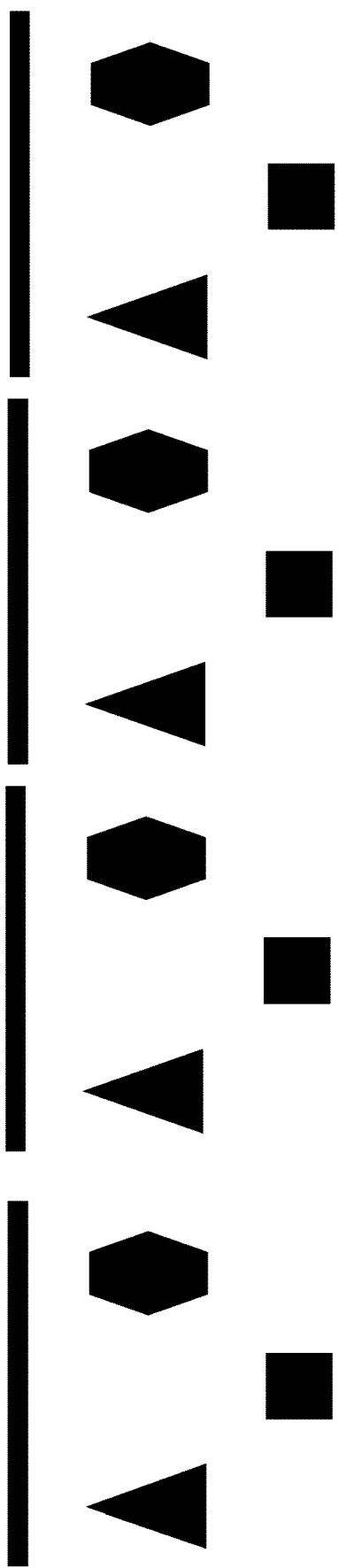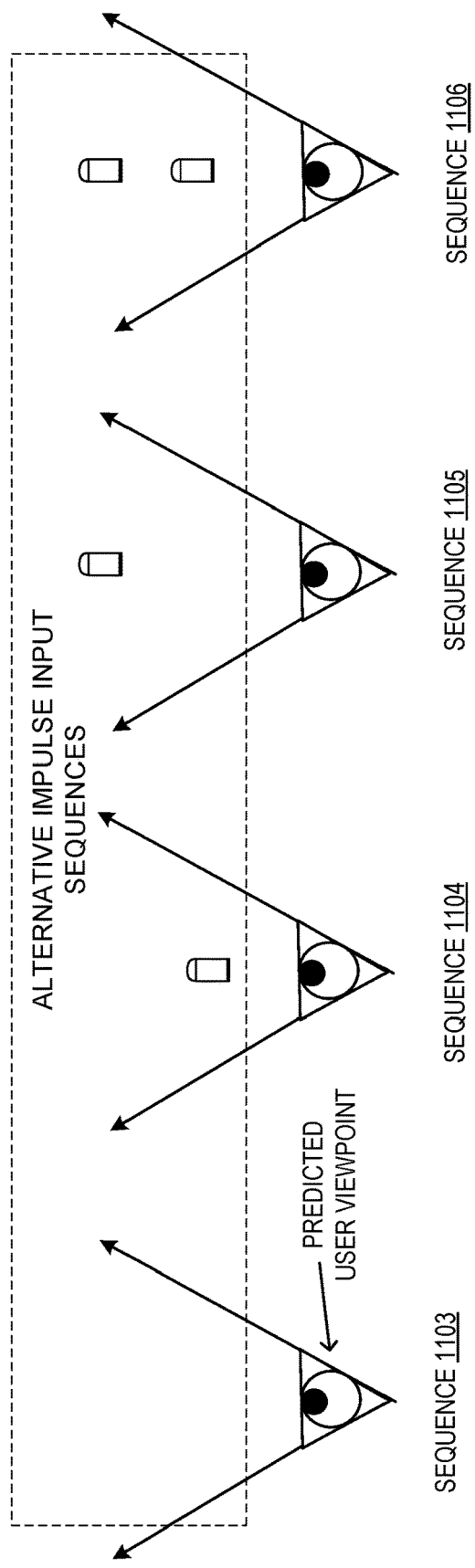

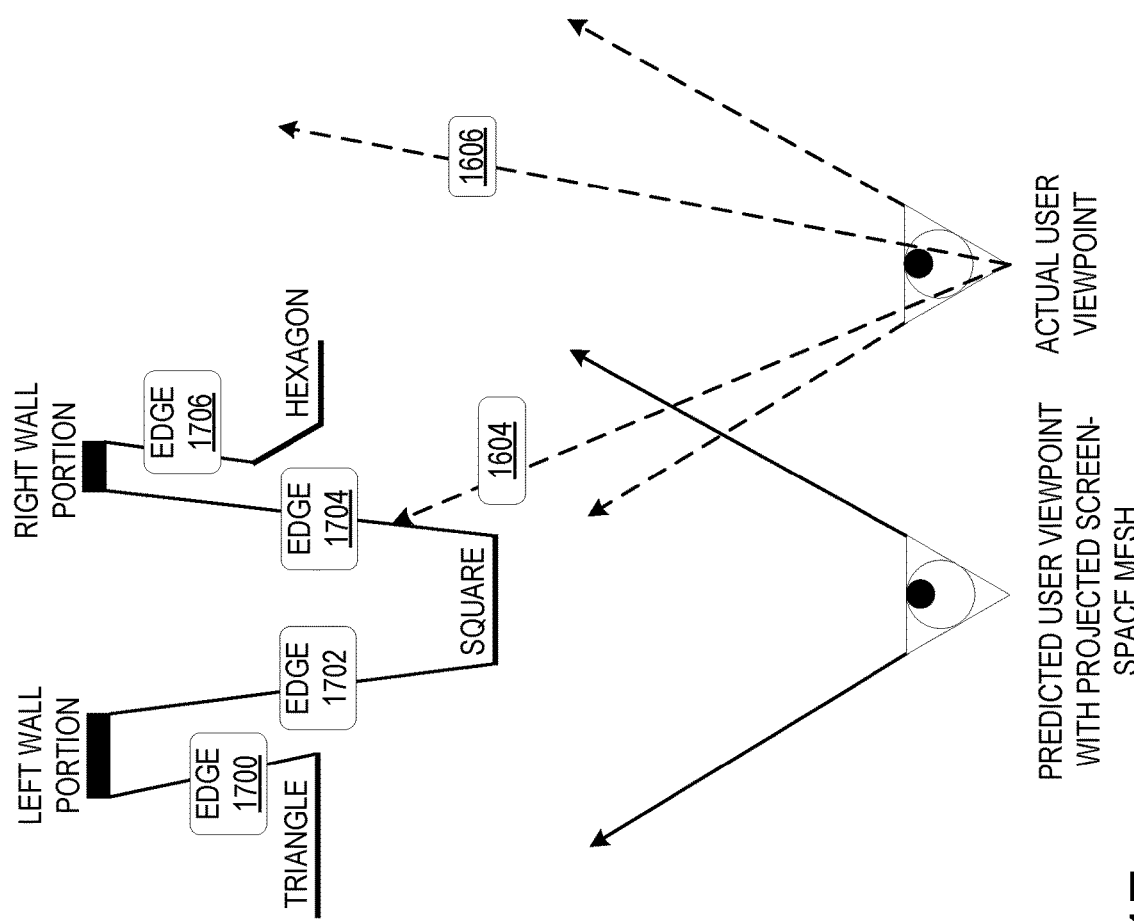
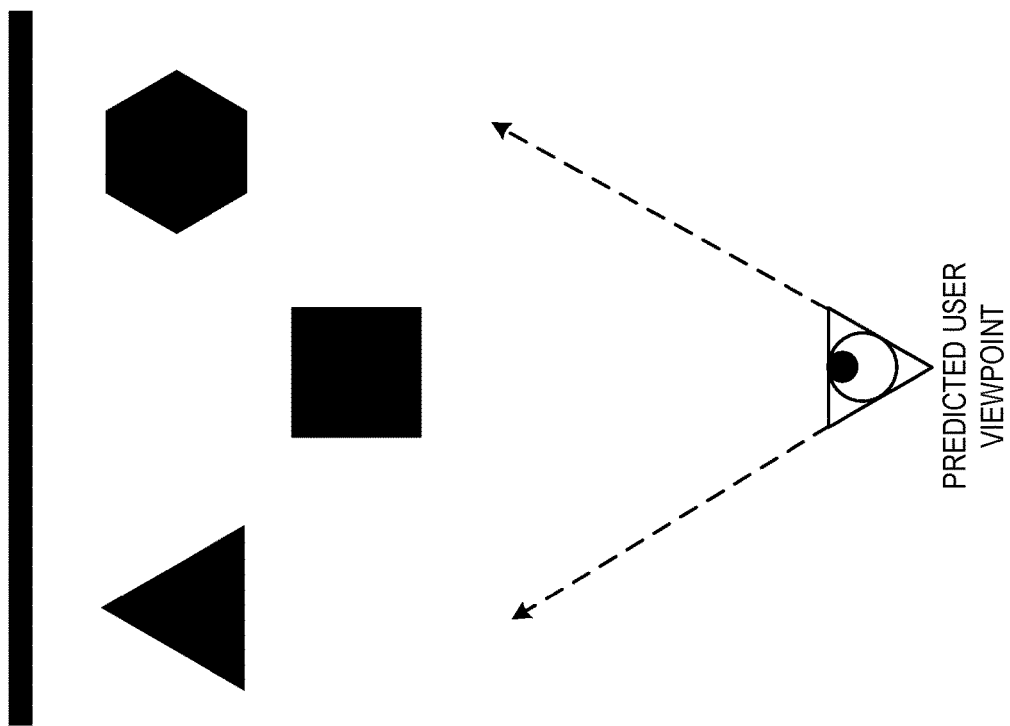
Fig. 17

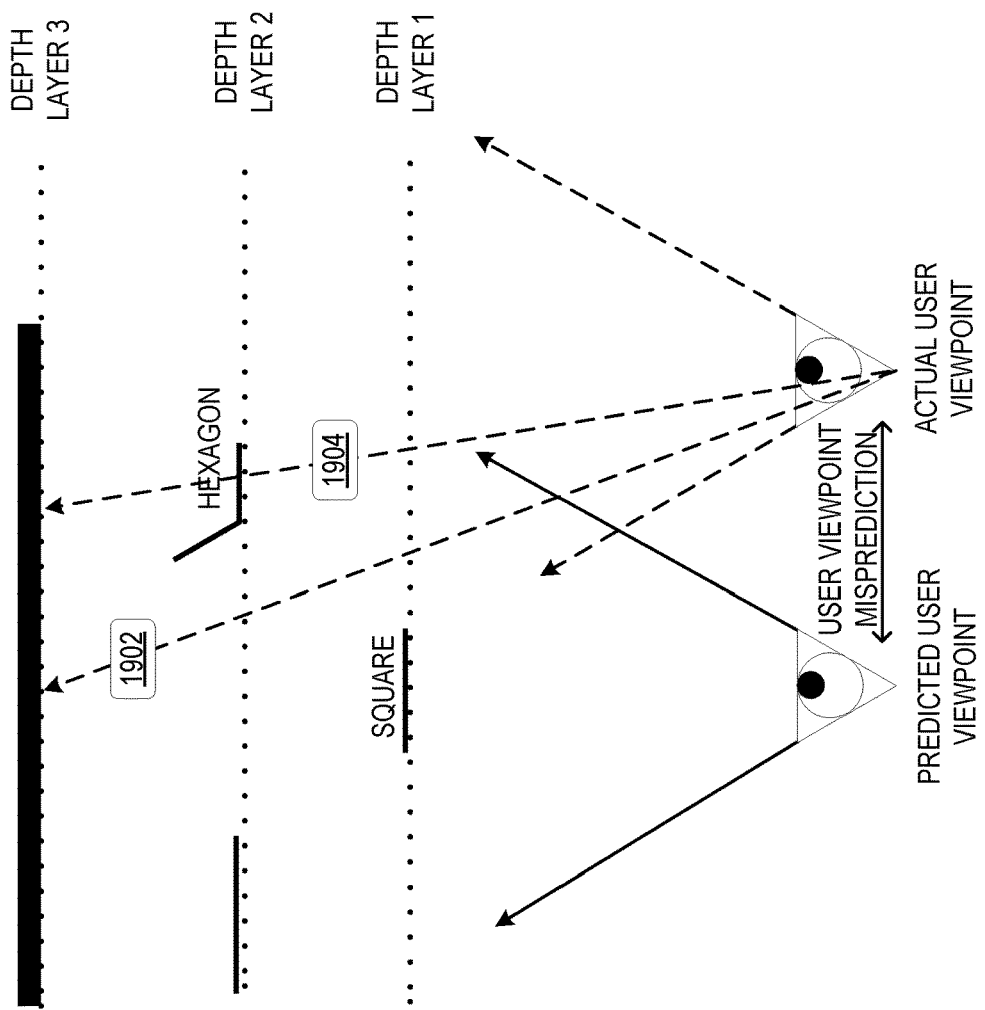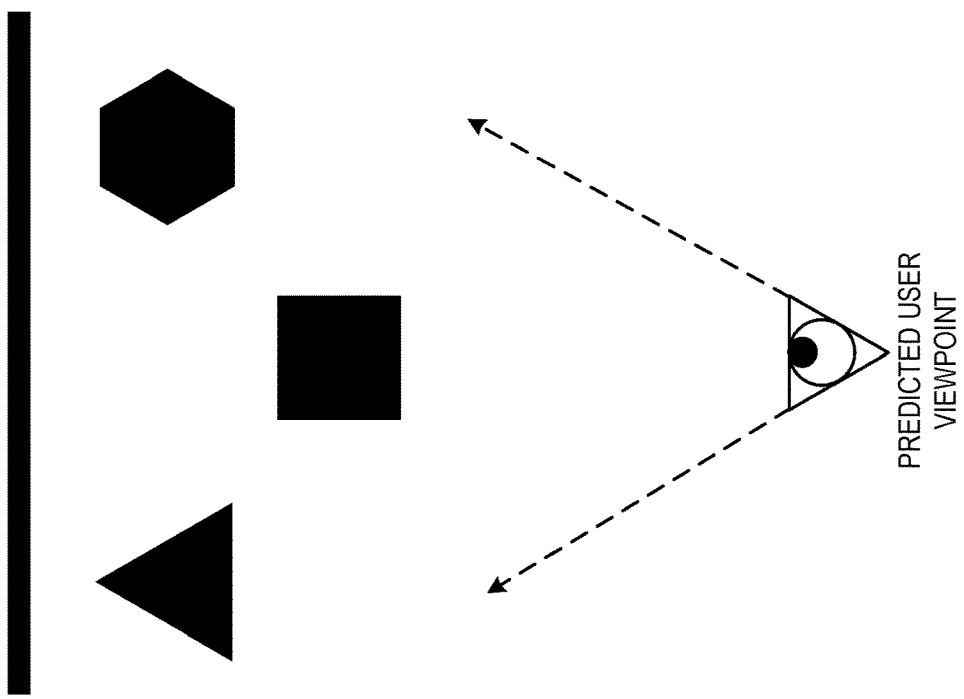
Fig. 19

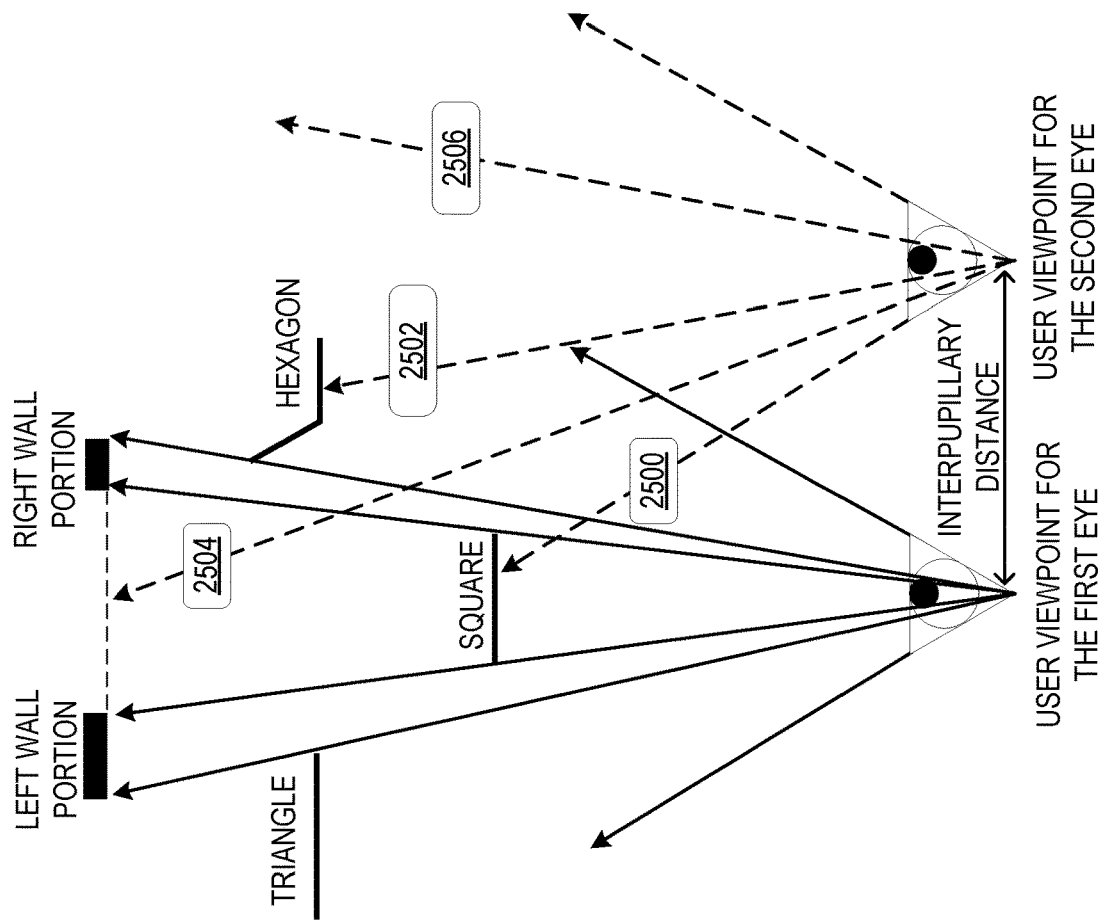
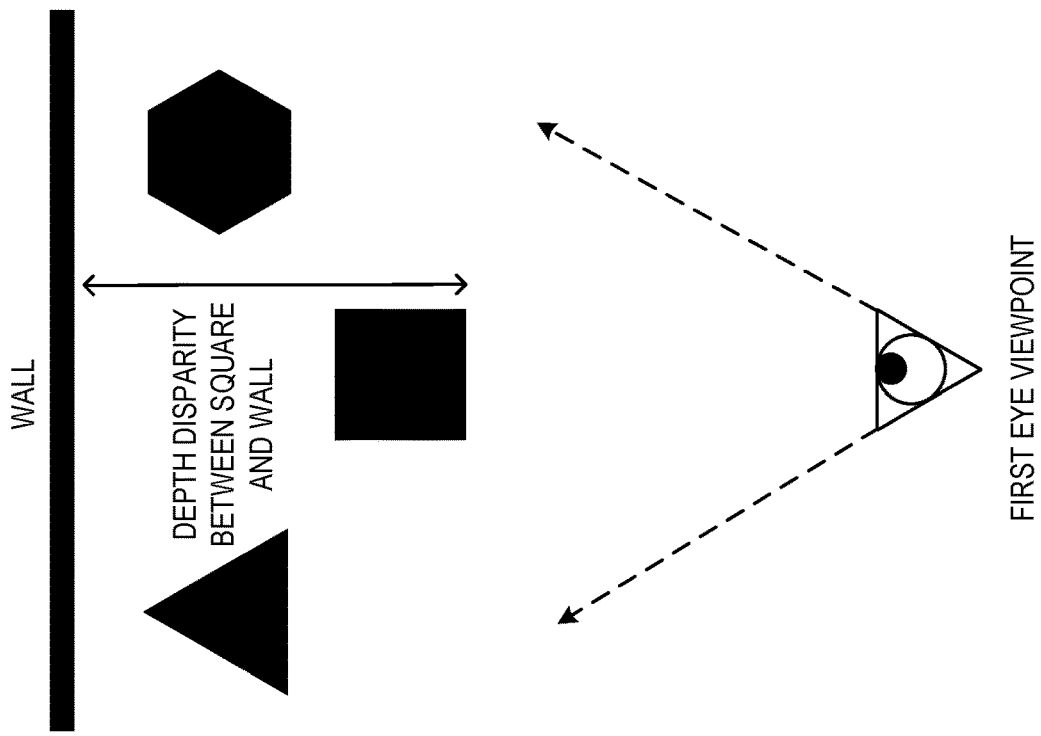
Fig. 22

PREDICTIVE SERVER-SIDE RENDERING OF SCENES

CROSS REFERENCE TO RELATED APPLICATIONS

This application is a continuation of U.S. patent application Ser. No. 15/691,608, filed Aug. 30, 2017, which is a continuation of U.S. patent application Ser. No. 14/603,213, filed Jan. 22, 2015, now granted as U.S. Pat. No. 9,756,375, the entire contents of each of which is hereby incorporated herein by reference for all purposes.

BACKGROUND

Recently, computer content has increasingly moved towards cloud platforms where dedicated servers render and stream content over a wide area network to client computing devices. In the genre of cloud-based streaming games, such streaming platforms allow service providers to centralize the rendering process for graphical scenes in games at datacenter servers. Server-side rendering offers several advantages. First, client computing devices can utilize the high-end graphics provided by powerful server GPUs, allowing the users to enjoy high-end graphics on less powerful client computing devices. Second, developers can specifically target their software for the datacenter servers, alleviating platform compatibility problems and increasing efficiency in platform performance tuning. Third, centralizing to datacenter servers increases the ease of bug fixing, software updates, hardware updates, and content additions. Lastly, users can select a vast library of content already loaded on the datacenter servers and instantly stream that content to their client computing devices.

One drawback of cloud-based streaming platforms is that wide-area networks can be subject to periods of high latency due to network congestion, packet loss, etc., and/or continually high latency caused by a large distance between the user and the server, which can degrade the user's ability to experience the streaming content in real-time without frequent pauses and delays. Current streaming platforms attempt to solve this problem through the use of content buffers. To implement a content buffer, servers stream content to the client computing device, where the content is placed into a content buffer that stores the content for display to the user. The client computing device waits until sufficient content has been buffered prior to playback to the user. After sufficient content is stored in the buffer, the content is displayed to the user. As the content is displayed, the buffer is refilled with streaming content from the server. Without a buffer, a period of high latency would result in a pause in playback; however, with a buffer, a pause in playback is not needed because a pause merely occurs in downloading the data stream to the buffer. In this manner, streaming content can be played to a user without perceived delays, since delays in downloading due to latency are absorbed by the buffer. However, while buffering can reduce user perceptions of delays in streaming content, buffering is subject to a rather large drawback when applied to applications such as gaming, in which user input at the client computing device is sent to the server and influences the rendered content. In these rendering applications, buffering can actually increase the user's perception of latency, due to the communication time lag between receipt of the content at the computing device and display of the content to the user. A small communication time lag may present an annoyance to the user as a small lag develops between user input and the response of the displayed content. However, a large communication time lag may make real-time game play over such networks frustrating and impractical.

SUMMARY

To address these issues, a server device and method are provided for use in predictive server-side rendering of scenes based on client-side user input. The server device may comprise a processor and a storage device holding instructions for a server application program executable by the processor to receive, at the server application program, a current user navigation input in a stream of user navigation inputs from a client device over a wide area network, calculate a predicted future navigation input based on the current user navigation input and a current application state of the server application program, render a future scene based on the predicted future navigation input to a rendering surface, and send the rendering surface to the client device over the wide area network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a timeline of the frame time from a user input to a displayed frame responsive to that input for a standard cloud gaming platform.

FIG. 2B is a timeline of the frame time from a user input to a displayed frame responsive to that input for one embodiment of the computing system of FIG. 1.

FIG. 11 is a graphical view and timeline for the possible alternative impulse input sequences of FIG. 1.

FIG. 12A-D are overhead prospective views that illustrate the alternative impulse input sequences of FIG. 11.

FIG. 17 is an overhead perspective view of a spatial interpolation method to fill visual holes caused by the user viewpoint misprediction of FIG. 15.

FIG. 19 is an overhead perspective view of a depth peeling method to fill visual holes caused by the user viewpoint misprediction of FIG. 15.

FIG. 22 is an overhead prospective view of visual holes that may arise due to depth disparity and interpupillary distance when synthesizing a viewport for a second eye for the HMD embodiment of FIG. 21.

DETAILED DESCRIPTION

Figure 1:
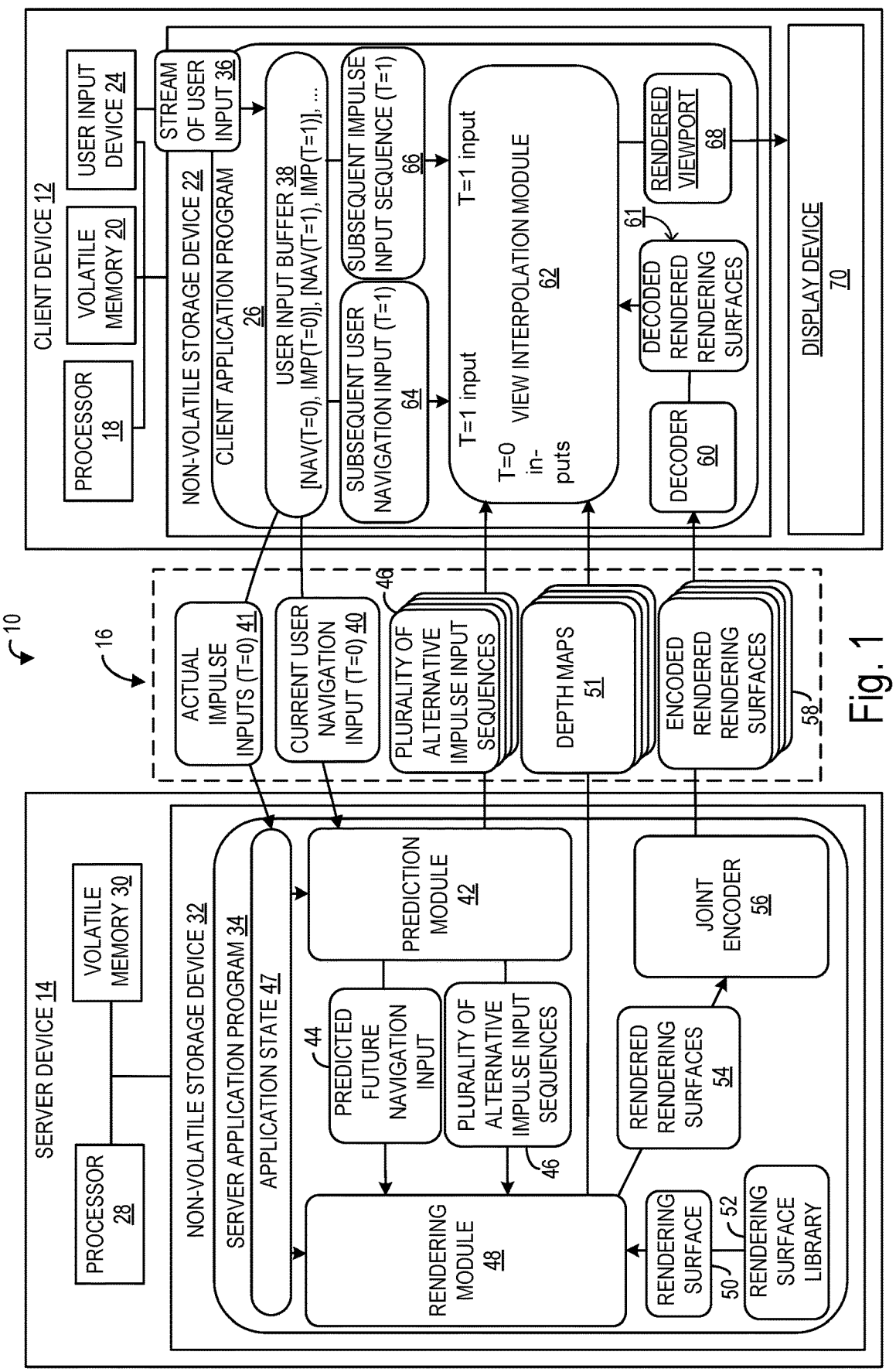
FIG. 1 is a schematic view of a computing system of one embodiment that includes a server device communicating over a network with a client device.

FIG. 1 illustrates generally a computing system 10 in which server-side rendering of scenes is performed based on predicted future client-side navigation input. By predicting a future client-side navigation input, the computing system 10 can render not only a scene having a field of view that is appropriate for the most recent user input, but may render a larger field of view that would be appropriate for the predicted future client-side navigation input. This larger field of view is sent to the client device, where it may be appropriately modified and displayed to the user, based on the most current actual user input received at the client device, as described in detail below. Such an approach offers the potential advantage of crisp responsiveness of the computing system, thereby decreasing the latency perceived by the user between user input and the display of server-side rendered content in response to the user input.

Computing system 10 typically includes a client device 12 configured to communicate with a server device 14 over a network 16, which may be a wide area network such as the Internet, or other suitable computer network. The client device 12 includes a processor 18, volatile memory 20, a non-volatile storage device 22, and at least one user input device 24 configured to receive user input from a user of the client device 12. The non-volatile storage device 22 holds instructions for a client application program 26 executable by the processor 18 to perform a variety of client-side functions, as described below. Similarly, the server device 14 includes a processor 28, volatile memory 30, and an associated non-volatile storage device 32. The non-volatile storage device 32 holds instructions for a server application program 34 executable by the processor 28 to perform a variety of server-side functions, as described below.

Within computing system 10 generally, the client device 12 gathers client-side user input and forwards that user input over the network to the server device 14, which in turn renders content based on the user input, and sends the rendered content back to the client device 12 over the network 16. As briefly described above, data traveling over network 16 may experience transmission delays due to network congestion or packet loss due to equipment failure, thereby triggering TCP slow start and requiring time-consuming retransmission under the TCP/IP protocols or continual high latency caused by a large distance between the user and the server. As a result, client device and server device may communicate over network 16 during periods of high latency. To reduce the perceived communication time lag between user input at the client device and subsequent display at the client device of responsive server-rendered content, a predictive rendering scheme is implemented according to which the server device renders extra content based on a future predicted input state, and the client device performs run-time decision making logic based on current user inputs, to determine the particular portion of the rendered content to display, and interpolates pixel data items to fill any visual holes left from any insufficiencies in the received rendered content, as described in detail below.

Turning first to the client device 12, it will be appreciated that the client device 12 receives a stream of user input 36 from user input device 24 at a user input buffer 38. The user input buffer 38 stores and organizes the stream of user input 36 and sends a current user navigation input 40 from the stream of user input 36 to the server application program 34 on the server device 14. It will be appreciated that the client device 12 may be a mobile computing device such as a smartphone, tablet, or head-mounted augmented reality computing device, a personal computing device, or a game console, as a few examples. The user input device 24 may be, for example, a touchscreen, keyboard, mouse, and/or sensors (e.g., gyroscope, accelerometers, depth camera, and/or RGB camera) mounted to a wearable computing device such as a head mounted augmented reality device, for example. It will be appreciated that navigational inputs such as the current user navigation input 40 are inputs that are interpreted by the client application 26 and server application 34 to navigate the user through a virtual space. For example, the client application program 26 and server application program 34 may be configured as a game that includes a virtual world that occupies a two- or three-dimensional game space. Navigation inputs may be interpreted by the program logic implemented in the client application program 26 and server application program 34 to cause a player character to travel through the game space in a direction indicated by the navigation inputs. It will be further appreciated that the user input may also include one or more actual impulse inputs 41, which are non-navigational inputs such as activating an object, activating an ability, etc. In the context of a first person perspective battle game, for example, an impulse input may cause a player character to wield a weapon, attack with the weapon, turn invisible, light a torch, etc. These inputs do not themselves cause navigation of the player character within the virtual world of the game.

The server application program 34 in turn receives the current user navigation input 40 at a prediction module 42. The prediction module 42 calculates a predicted future navigation input 44. It will be appreciated that predicted future navigation input 44 may be calculated using a neural network time-series prediction model, a linear and polynomial regression model, or a Markov model, as a few examples. In one exemplary embodiment, a discrete time Markov chain is applied to calculate the predicted future navigation input 44, as described below. The non-navigational actual impulse inputs 41 are received at the server device 14, as well. While these inputs do affect the application state 47 of the server application program, in one embodiment they are not used to predict navigational inputs, and therefore in the Figures are not shown as being passed to the prediction module 42, but are shown being received generally by the server application program 34.

In one example Markov model that may be implemented by prediction module 42, time is quantized, with each discrete interval representing a clock tick of the server application program 34. The random variable navigation vector $N_t$ represents the change in 3-D translation and rotation at time t: $N_t = \{\delta_{x,t}, \delta_{y,t}, \delta_{z,t}, \theta_{x,t}, \theta_{y,t}, \theta_{z,t}\}$ Each component above is quantized. $N_t$ represents an actual empirical navigation vector received from the client as current user navigation input 40. The prediction module 42 calculates a state estimation problem to find the maximum likelihood estimator $\hat{N}_{t+\lambda}$ where $\lambda$ is the round trip time (RTT) over the network 16 between the client device 12 and the server device 14.

Using the Markov model, the probability distribution of the navigation vector at the next time step is dependent only upon the navigation vector from the current time step: $p(N_{t+1}|N_t)$. The prediction module 42 predicts the most likely navigation vector $\hat{N}_{t+1}$ at the next time step as:

$$\hat{N}_{t+1} = E[p(N_{t+1} | N_t = n_t)] = \underset{N_{t+1}}{\mathrm{argmax}} p(N_{t+1} | N_t = n_t)$$

where $N_t = n_t$ indicated that the current time step has been assigned a fixed value by sampling the actual user input $n_t$. In many cases, the RTT is longer than a single time step (e.g., 32 ms). To handle this case, the prediction module 42 predicts the most likely value after one RTT as:

$$\hat{N}_{t+\lambda} = \underset{N_{t+\lambda}}{\mathrm{argmax}} p(N_{t+1} | N_t = n_t) \prod_{i=1 \ldots \lambda-1} p(N_{t+i+1} | N_{t+i})$$

where $\lambda$ represents the RTT latency expressed in units of clock ticks.

The above Markov model when implemented by the prediction module 42 has been found to have the desirable effect that, $N_{t+1}$ is memoryless (i.e., independent of the past given $N_t$), and additional user input history (in the form of longer Markov chains) does not show a measurable benefit in terms of prediction accuracy. The prediction module 42 treats each component of the vector N independently, and constructs six separate models. The beneficial effect of this approach is that less training is required when estimating $\hat{N}$, and it has been found that treating the vector components independently does not hurt prediction accuracy.

After calculating the predicted user navigation input 44, the prediction module 42 determines a plurality of alternative impulse input sequences 46 for different permutations of impulse inputs that can occur based on a current application state of application state 47 within a communication lag time (e.g. one RTT) between the server device and client device. As described above, impulse inputs are non-navigational user inputs such as wielding a weapon, attacking with the weapon, activating an object such as a torch, activating an ability such as invisibility, etc. In one exemplary embodiment, the prediction module 42 considers all possible sequences of impulse inputs that can occur in one RTT. For example, according to the program logic of the server application program 34 and the client application program 26, it may be possible for a user to activate the impulse input of firing a weapon at every clock tick of the client application program 26. Accordingly, if the RTT is two clock ticks, then the prediction module 42 considers impulse input sequences corresponding to firing a weapon at both clock ticks, as well as firing the weapon at the first clock tick and not the second clock tick, not firing the weapon at the first clock tick and firing the weapon at the second clock tick, or not firing the weapon at either clock tick. Accordingly, these four alternative possibilities would be included within the plurality of alternative impulse input sequences 46. In cases where the network latency is high, such as if the RTT is 8 clock ticks long, the state space for possible impulse input sequences may become undesirably large.

To reduce the number of possible alternative impulse input sequences that can occur during one RTT, the prediction module 42 typically only allows impulse input activations to occur at a subsampling periodicity U that is greater than one clock tick of the server application program 34 and the client application program 26. This subsampling reduces the state space of all possible impulse input sequences considered by the prediction module 42 to $2^{\lambda/\sigma}$.

The prediction module 42 sends the predicted future navigation input 44 and the plurality of alternative impulse input sequences 46 to the rendering module 48. The rendering module 48 retrieves a plurality of rendering surfaces 50 from a rendering surface library 52. Based on the predicted future navigation input 44, the plurality of alternative impulse input sequences 46, and the current application state of application state 47 of the server application program 34, the rendering module 48 renders a plurality of future scenes having a predicted user viewpoint to the plurality of rendering surfaces 50 and a corresponding plurality of depth maps 51. Each depth map 51 contains depth values representing distances in the virtual world (game space) from a point corresponding to the predicted user viewpoint to each pixel (or group of pixels) in each rendered rendering surface. The rendering module 48 sends the rendered rendering surfaces 54 to a joint encoder 56. It is expected that the predicted future navigation input 44 will not always completely match the actual navigation input entered from the user. To account for user viewpoint mispredictions, rendering module 48 renders the future scene with a larger field of view than a viewport of the client application program 26 at the client device 12. By rendering with a larger field of view, even if the actual user viewpoint has a different orientation than the predicted user viewpoint, such as the user is looking further to the right than was predicted, that actual user viewpoint has a high probability of still being contained within the rendered larger field of view. When rendering with the larger field of view, the plurality of rendering surfaces 50 will not necessarily be a rectangle as in a viewport for a game application. In some embodiments, the plurality of rendering surfaces may be a cubemap, a clipped cubemap, an edge, a tetrahedron, or other type of rendering surface.

To perform the rendering, an exemplary embodiment of rendering module 48 creates a plurality of slave instances, each of which is a modified instance of the original server application program 34. The slave instances are configured to execute the predicted future navigation input 44 and one alternative impulse input sequence from the plurality of alternative impulse input sequences 46 according to the program logic of the server application program 34. For each slave instance a predicted user viewpoint is determined based on the predicted future navigation input 44. After execution of the program logic of the server application program, each slave instance renders its own future scene from the predicted user viewpoint based on the current application state of application state 47 and the alternative impulse input sequence it received to a rendering surface and creates a corresponding depth map of the future scene. After rendering, each slave sends its own rendered rendering surface and depth map to a master process in rendering module 48. The master process may vary the number of slave instances dependent upon the length of the RTT, and is responsible for forwarding the renderings completed by each slave instance for downstream processing by the joint encoder 56.

It will be appreciated that not all of the speculative sequences for impulse inputs and navigation inputs will be correct, and indeed it is possible that none of the speculative sequences is correct. Consequently, the slave instances may have executed speculative sequences for impulse inputs and navigation inputs that were mispredictions, and will have incorrect application states. To account for this, the system may roll back the incorrect slave instances to a correct application state using one or more of the following techniques: page-level checkpointing, object-level checkpointing, and restore functions.

For page-level checkpointing, the server application program keeps copies of pages of memory corresponding to past application states of the server application program in order to roll back to a past application state if the current application state resulted from incorrect speculative input sequences of navigational inputs and impulse inputs. To accomplish this, the server application program implements page-level copy-on-write. At the start of a speculation sequence for navigation inputs or impulse inputs, the server application program marks all pages read-only. When a page fault occurs, the server application program makes a copy of the original page and sets the protection level of the faulted page to read-write. When new input arrives, the server application program invalidates and discards speculative input sequences that do not match the new input. In order to roll back to a checkpoint, the server application program copies back the original content using the copies of the original page that it created. The server application program discards any pages created as a result of new object allocations since the last checkpoint. Additionally, page deallocation resulting from deleted objects during a speculative sequence are deferred as those deleted objects may need to be restored if the speculative sequence is incorrect.

For object-level checkpointing, the lifetime of each object is tracked by the server application program. To roll back a speculation sequence, objects that did not exist at the time of the checkpoint being rolled back to are deleted, and objects that were deleted during the incorrect speculation sequence since the checkpoint being rolled back to are restored.

After receiving the rendered rendering surfaces 54 from the rendering module 48, the joint encoder 56 jointly encodes the rendered rendering surfaces 54 and sends encoded rendered rendering surfaces 58 over the network 16 to the decoder 60 at the client device 12. In an exemplary embodiment, the joint encoder 56 divides the rendered rendering surfaces 54 into macroblocks (e.g. 64×64 bit). A search process of the joint encoder identifies macroblocks that are equivalent (in a lossy domain) intra-frame, inter-frame, and across the different streams of rendered rendering surfaces corresponding to each slave instance. The purpose of the encoding by the joint encoder 56 is to reduce the amount of data that represents the encoded rendered rendering surfaces, to increase the speed of data transmission and reduce bandwidth consumption, which contributes to the user's decreased perception of latency at the client device 12.

At the decoder 60 of the client device 12, the encoded rendered rendering surfaces 58 are decoded, and the decoded rendered rendering surfaces 61 are sent to the view interpolation module 62. The view interpolation module 62 additionally receives the plurality of alternative impulse input sequences 46 from the prediction module 42 and the plurality of depth maps 51 from the rendering module 48.

The user input buffer 38 receives a subsequent user navigation input 64 and a subsequent impulse input sequence 66 in the stream of user input 38 from user input device 24, and sends the subsequent user navigation input 64 and the subsequent impulse input sequence 66 to the view interpolation module 62. Thus, it will be appreciated that the plurality of alternative impulse input sequences 46, the encoded rendered rendering surfaces 58, and depth maps 51 received from the server device 14 were calculated and predicted based on user input at a quantized time step (e.g., T=0) that was current for the server device but is now past input for the client device due to the time-lag in client server communications. It will be further appreciated that the subsequent user navigation input and the subsequent impulse input sequence 66 received from the user input buffer 38 represents user input from a later quantized time step (e.g., T=1) that is the most current user input received at the client device.

The view interpolation module 62 is configured to select an alternative impulse input sequence from the plurality of alternative impulse input sequences 46 based on (i.e., that corresponds to) the subsequent impulse input sequence 66. In an exemplary embodiment, the view interpolation module 62 is configured to compare each alternative impulse input sequence of the plurality of alternative impulse input sequences 46 to the subsequent impulse input sequence 66 and determine which alternative impulse input sequence matches the subsequent impulse input sequence 66. Thus, for example, if the current impulse input sequence 66 is input to fire a weapon twice in a row, then the alternative impulse input sequence 66 corresponding to firing a weapon twice in a row is selected.

The view interpolation module 62 is further configured to select the rendered rendering surface that corresponds to the selected alternative impulse input sequence. The view interpolation module 62 reconstructs a viewport for an actual user viewpoint by reprojecting from the selected rendered rendering surface to a viewport of the client application program 26 based on the plurality of depth maps 51 and the subsequent user navigation input. The view interpolation module 62 sends the reconstructed viewport 68 be displayed on the display device 70.

Thus, the client application program 26 is configured to communicate with server application program 34 to send user input to the server device 14 and in response download predictive rendered content from the server application program 34 and perform image based rendering techniques on the predictive rendered content to reconstruct and display a rendered viewport that is responsive to the user's current input.

Now turning to FIG. 2A, a client-server communication flow for a standard cloud gaming platform is illustrated. In such a standard cloud gaming platform, the frame time, which is the time elapsed from the moment that the client device receives a user input to the moment when a frame corresponding to that user input is rendered and displayed, must necessarily include a full RTT. This is caused by the intrinsic fact that in such a cloud gaming platform, the server cannot begin rendering a frame until it has received the user input for that frame, which takes half an RTT. After rendering the frame, it will then take another half an RRT for the frame to be received by the client device over the network. Thus, no matter how fast the server can render the frame, the frame time from when the user inputs a command to the time that the user can see the results of that input is at least one RTT in time. If the RTT over the network is long, then the frame time will become impractically long and hinder the user's experience of the content.

FIG. 2B shows a client-server communication flow by the system 10 of the configuration shown in FIG. 1. With this configuration, the user similarly enters an input 0 at time T0. Input 0 takes one half an RTT to be received at the server device. However, at T2, rather than rendering a frame for input 0, the server device predicts user input 1-5 based on user input 0. The server device then renders a frame that corresponds to this sequence of inputs, and sends that rendered frame 5 to the client device. Frame 5 takes one half an RTT to travel over the network and be received at the client device. It will be appreciated that before the user has even entered input 5, the client device has already received a rendered frame corresponding to a predicted input 5 from the server device. Accordingly, after the user enters the actual input 5, the client device reconstructs a viewport for the actual user input 5 by reprojecting from the rendered frame 5 to the viewport for the actual user input 5, correcting for any mispredictions made by the server device. The reconstructed viewport can then be displayed to the user. From the user's perspective, the frame time from when that user entered actual input 5 to being shown a rendered viewport corresponding to that actual input 5, is a negligibly short amount of time. It will be appreciated that FIG. 2(B) depicts a stream of user input and a stream of displayed viewports, such that a viewport corresponding to input 0 was also displayed to the user alongside the input 0 being sent to the server device, with the viewport for input 0 being reconstructed from a rendered frame that was rendered based on predicted user input from time T-4, T-3, T-2, and T-1.

Figure 3A:
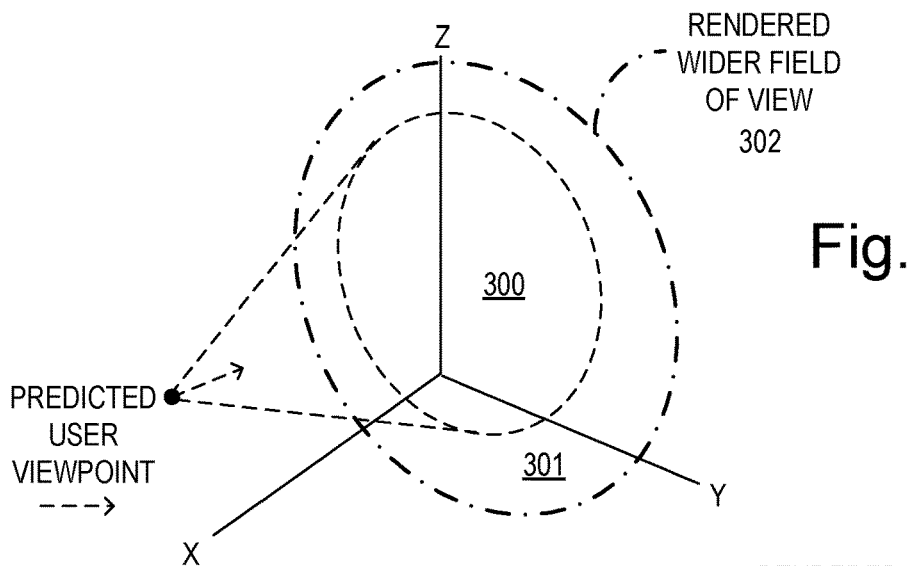
FIG. 3A is a graphical view that illustrates a wider field of view rendered by the rendering module of FIG. 1.
Figure 3B:
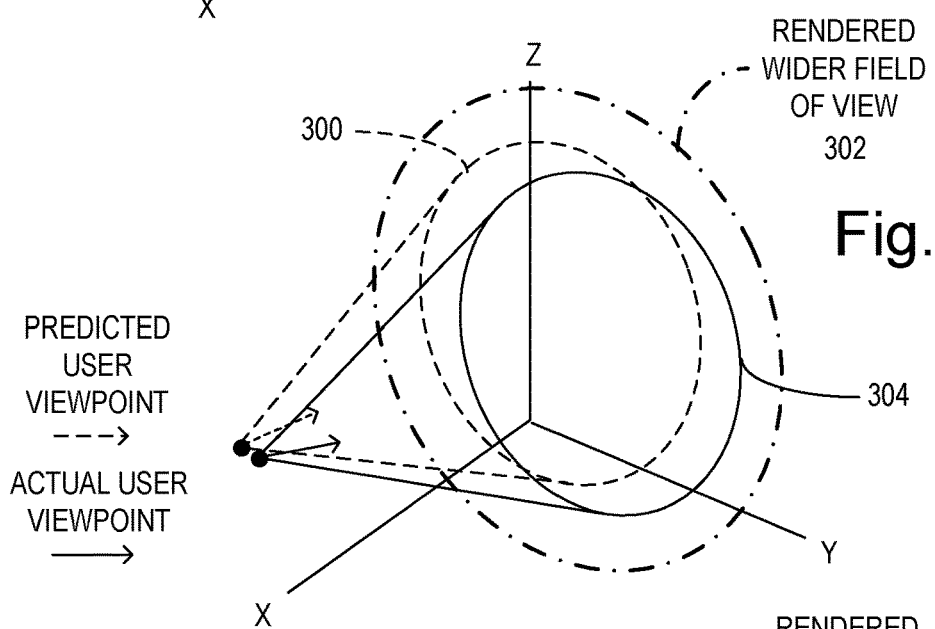
FIG. 3B is a graphical view that illustrates an actual user viewpoint with an actual viewed area that is contained within the rendered wider field of view of FIG. 3A.
Figure 3C:
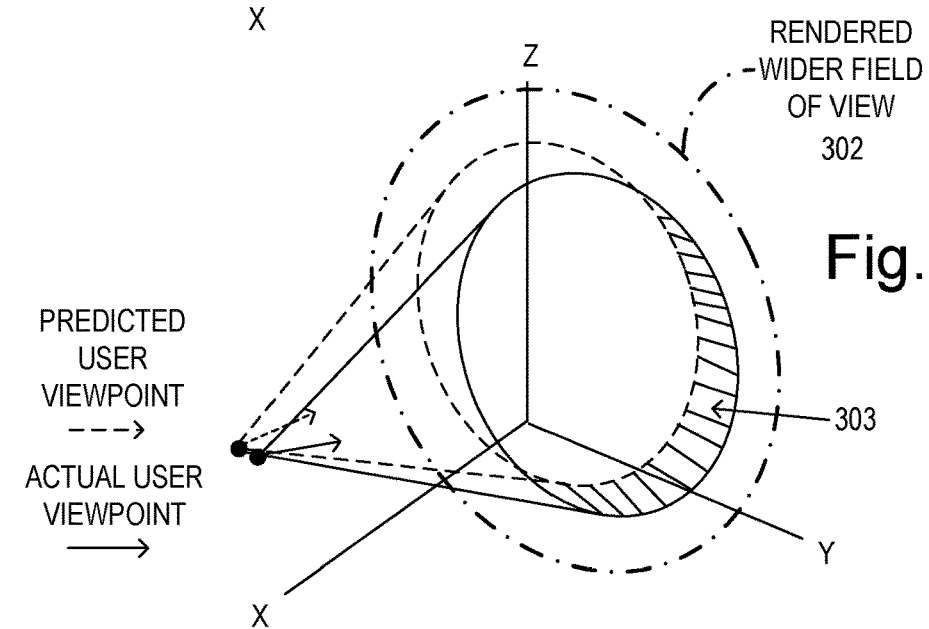
FIG. 3C is a graphical view that illustrates the portion of the non-displayed rendered pixel data items that are contained within the actual viewed area of FIG. 3B.

One type of misprediction that may be made by the server device is a user orientation misprediction. FIG. 3(A) depicts a 3D space with a predicted user viewpoint that results in the predicted viewed area 300. To account for the possibility of a user orientation misprediction, rather than only rendering the predicted viewed area 300 for the viewport of the client application program on the client device, a wider field of view 302 is rendered with rendered non-displayed portion 301 that is outside of the predicted viewed area 300 and would thereby be outside a viewport of the client application program centered at the predicted viewed area 300, as shown in FIG. 3(A). After the subsequent user navigation input has been received, the actual user viewpoint can be determined. If the actual user viewpoint is the same as the predicted user viewpoint, then the predicted viewed area 300 can safely be displayed unaltered to the user, and the rendered non-displayed region 301 is not displayed to the user. However, the actual user viewpoint may deviate from the predicted user viewpoint. For example, the user's head may be positioned and oriented in slightly differently (in the Figure, slightly to the right) compared to the predicted user viewpoint, as shown in FIG. 3(B). This deviation is referred to herein as a user orientation midprediction. As shown in FIG. 3(B), if only the predicted viewed area 300 was rendered, the client device would not have enough visual data to reconstruct a viewport for the actual viewed area 304. However, as shown in FIG. 3(C), because the wider field of view 302 was rendered according to the techniques described above, the portion 303 of the actual viewed area that is outside of the predicted viewed area is still contained within the rendered wider field of view 302. Accordingly, the rendered wider field of view 302, including a portion of the rendered non-displayed region 301 corresponding to the portion 303 of the actual viewed area 304, can be reprojected to a viewport of the client application for the actual viewed area 304 and displayed to the user, without requiring the server device to re-render the scene. It will be appreciated that although the viewed areas are schematically depicted as being circular, the viewed area may be many different kinds of shapes, such as a rectangle corresponding to a viewport of client application program. Additionally, although the rendered wider field of view was also schematically depicted as being circular, it may also have many different kinds of shapes, such as a cubemap, clipped cubemap, edge, tetrahedron, etc.

Figure 4:
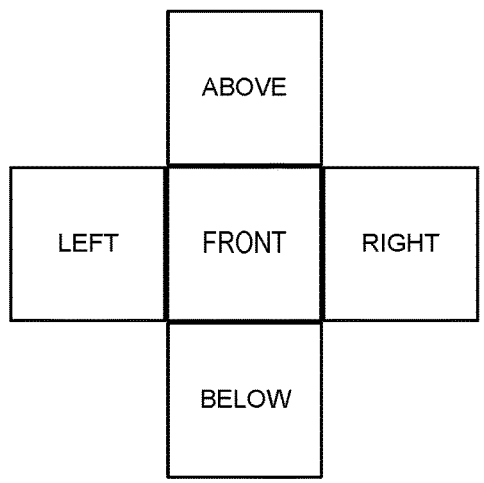
FIG. 4 is an illustration of a cubemap embodiment of the rendering surface of FIG. 1.

When rendering to a wider field of view in 3D space, rendering surfaces such as a cubemap, clipped cubemap, edge, tetrahedron, etc., can be used. FIG. 4 depicts an embodiment of a cubemap rendering surface that has a front plane, left plane, right plane, above plane, a below plane, and a back plane that is not shown, with directions in reference to a viewpoint that would be inside a cube defined by the cubemap. With a full cubemap of 6 planes, the user viewpoint is entirely encompassed within the cubemap, and a viewport for any user orientation can be reconstructed from the rendered cubemap.

Figure 5:
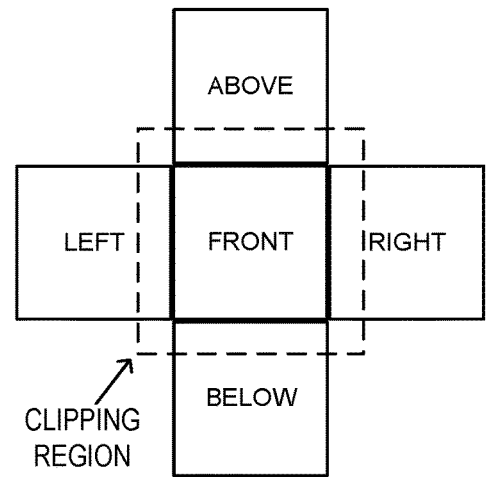
FIG. 5 is an illustration of a clipped cubemap embodiment of the rendering surface of FIG. 1.

Generally, rendering to all 6 planes of the cubemap is unnecessary as the actual user viewpoint is unlikely to diverge from the predicted user viewpoint so significantly as to necessitate rendering in the opposite direction of a current user perspective, for example. An embodiment of the clipped cubemap is shown in FIG. 5. In this embodiment of the clipped cubemap, the front plane of the cube, which is in the direction of the predicted user viewpoint, is fully rendered. However, only portions of the left plane, right plane, above plane, and below plane are rendered. The dotted line in FIG. 5 marks the clip region for an example rendering, wherein regions outside the clip region are not rendered. The percentage of clipping is determined based on an expected variance of the prediction error, a quantization of the expected magnitude of misprediction made by the prediction module of the server device. If the variance is high, then a larger portion of the cubemap is rendered. Conversely, if the variance is low, then it is safe to render a smaller portion of the cubemap, thereby reducing bandwidth consumption.

Figure 6:
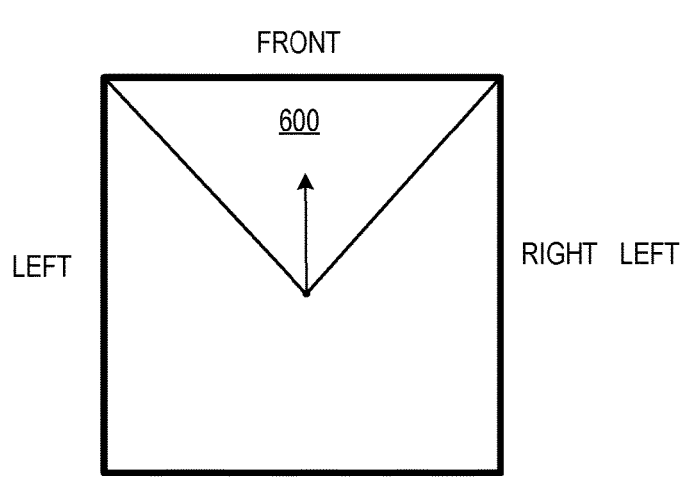
FIG. 6 is an illustration of a predicted viewed area for a predicted user orientation for the cubemap embodiment of FIG. 4.

FIG. 6 depicts a rendered cubemap with a predicted user viewpoint located in the middle of the cube defined by the cubemap having a predicted user orientation of looking towards the predicted scene on the front plane. The predicted viewed region 600 is the whole rendered front plane of the cubemap.

Figure 7:
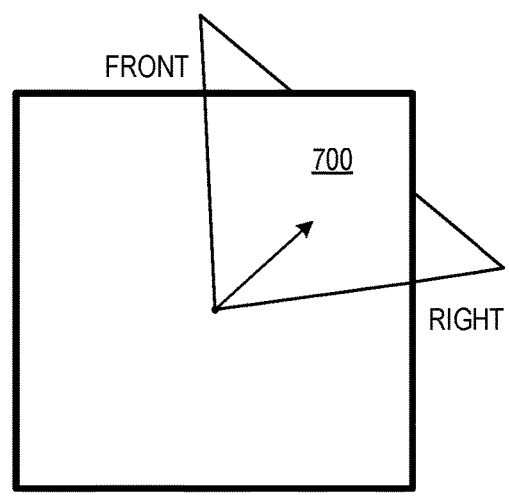
FIG. 7 is an illustration of an actual viewed area for an actual user orientation for the cubemap embodiment of FIG. 4.

FIG. 7 shows the actual user viewpoint having the actual user orientation. From the actual user viewpoint, the actual viewed region 700 is different from the predicted viewed region 600. However, because the right plane of the cubemap is also rendered as part of the rendered wider field of view, a viewport for the actual viewed region 700 can be reconstructed by reprojecting from corresponding portions of the rendered front plane and corresponding portions of the rendered right plane to the viewport of the client application program for the actual user viewpoint.

Figure 8:
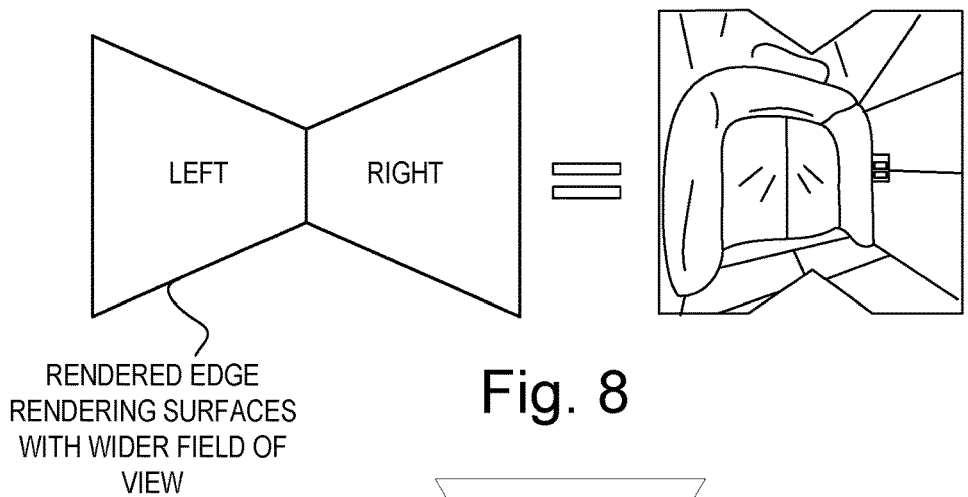
FIG. 8 is an illustration of an edge embodiment of the rendering surface of FIG. 1.
Figure 9:
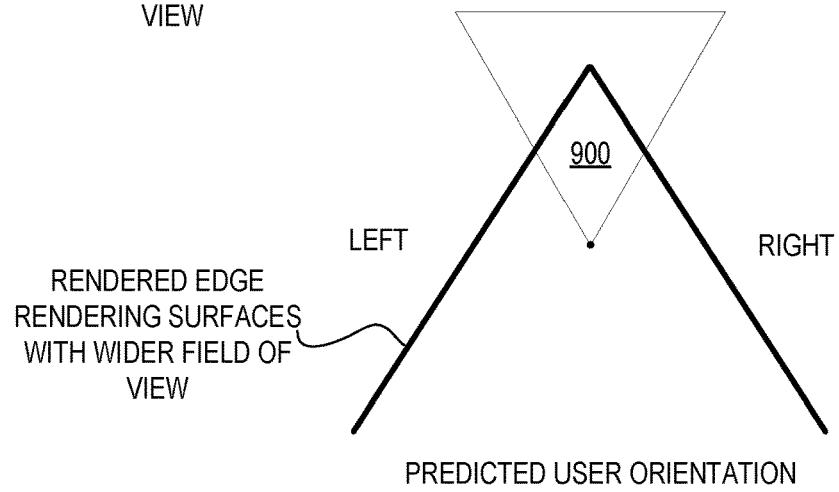
FIG. 9 is an illustration of a predicted viewed area for a predicted user orientation for the edge embodiment of FIG. 8.

In another embodiment of the rendering surface, an edge shape is used. FIG. 8 illustrates the edge shape, wherein a left plane and a right plane are rendered, and angled such that the two planes meet at an edge. The future scene is rendered to the edge such that the predicted user viewpoint with a predicted user orientation is looking towards the acute angle side of the edge where the two planes meet and has a predicted viewing region 900, as shown in FIG. 9.

Figure 10:
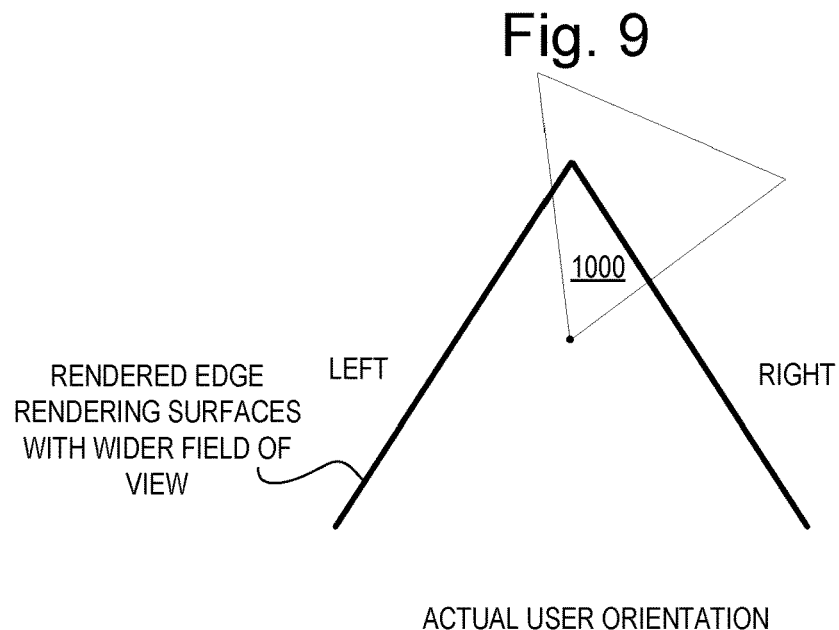
FIG. 10 is an illustration of an actual viewed area for an actual user orientation for the edge embodiment of FIG. 8.

FIG. 10 shows the actual user viewpoint having the actual user orientation. From the actual user viewpoint, the actual viewed region 1000 is different from the predicted viewed region 900. However, because the right plane of the edge is rendered beyond just the portion contained in the predicted view region 900, the actual viewed region 1000 is still contained within the rendered edge rendering surface. Thus, a viewport for the actual viewed region 1000 can be reconstructed by reprojecting from the corresponding portions of the rendered left plane and the corresponding portions of the rendered right plane to the viewport of the client application program for the actual user viewpoint.

It will be appreciated that typically there is a high likelihood that the actual user viewpoint will be close to the predicted user viewpoint. Accordingly, the rendering quality for the actual user viewpoint can be increased while simultaneously reducing server, client, and network bandwidth costs through likelihood based foveation, a technique that reallocates pixels to areas which are more likely to be viewed. With likelihood based foveation, the rendered rendering surface is rendered with a high resolution at areas with a high likelihood of actually being viewed and rendered with a lower resolution at areas with a low likelihood of actually being viewed.

In embodiments using the clipped cubemap and likelihood based foveation, the most likely location to be actually be viewed is the front face of the cube, which is the predicted viewed area. Accordingly, the front face of the clipped cubemap is rendered with a higher resolution than the above, below, left, and right planes of the clipped cubemap.

Now turning to FIG. 11, the number of possible alternative impulse input sequences depends upon the communication lag time between the server device and the client device (e.g. one RTT). In the example depicted in FIG. 11, the communication lag time ($T_0$, $T_1$, $T_2$) is long enough that two impulse inputs could be activated within the communication lag time. An embodiment of the server application program may be a game application. In this embodiment, the application state may consist of the current state of the game world, including a current state of the user's character. For example, in a current application state of the game application, the user may have only unlocked a single weapon and no abilities. Accordingly, as illustrated in FIG. 11, the current application state of the server application program only permits one type of impulse input, which may be the user firing their one weapon, and thus at any time T, either the single impulse input is activated or the impulse input is not activated. Accordingly, there are four permutations of the single impulse input allowed by the current application state: sequence 1103 [No Activation, No Activation]; sequence 1104 [No Activation, Activation]; sequence 1105 [Activation, No Activation]; and sequence 1106 [Activation, Activation].

In an exemplary embodiment, each alternative impulse input sequence from FIG. 11 is executed using the server application logic, which may be a game application as an example as described above, and the future scene is rendered based on the predicted future navigation input and each alternative impulse input sequence. FIGS. 12(A)-(D) show an overhead view of the future scene to be rendered according to the above embodiment. In FIGS. 12(A)-(D), a predicted user viewpoint was previously derived from the predicted future navigation input and is the same for each of the FIGS. 12(A)-(D). FIG. 12(A) is the scene corresponding to sequence 1103 of FIG. 11, which is [No activation, No activation]. FIGS. 12(B), 12(C), and 12(D) correspond to sequences 1104, 1105, and 1106 respectively. In this embodiment, the impulse input is firing a weapon. As FIG. 12(A) corresponds to a sequence of no impulse input activations, and thus the weapon is never fired, no bullets are rendered. FIG. 12(B) corresponds to a sequence of [No Activation, Activation], thus the weapon will have just been fired at $T_2$ before the scene is rendered, and the bullet will still be near the user. On the other hand, FIG. 12(C) corresponds to the sequence [Activation, No Activation], meaning a bullet is fired $T_1$ and no bullet is fired at $T_2$, thus a single bullet is rendered farther away from the user as the first bullet will have travelled during $T_2$. Lastly, FIG. 12(D) corresponds to the sequence [Activation, Activation], wherein a bullet is fired at $T_1$ and $T_2$. Accordingly, the scene is rendered with two bullets, one far away from the user and one close to the user.

Figure 13:
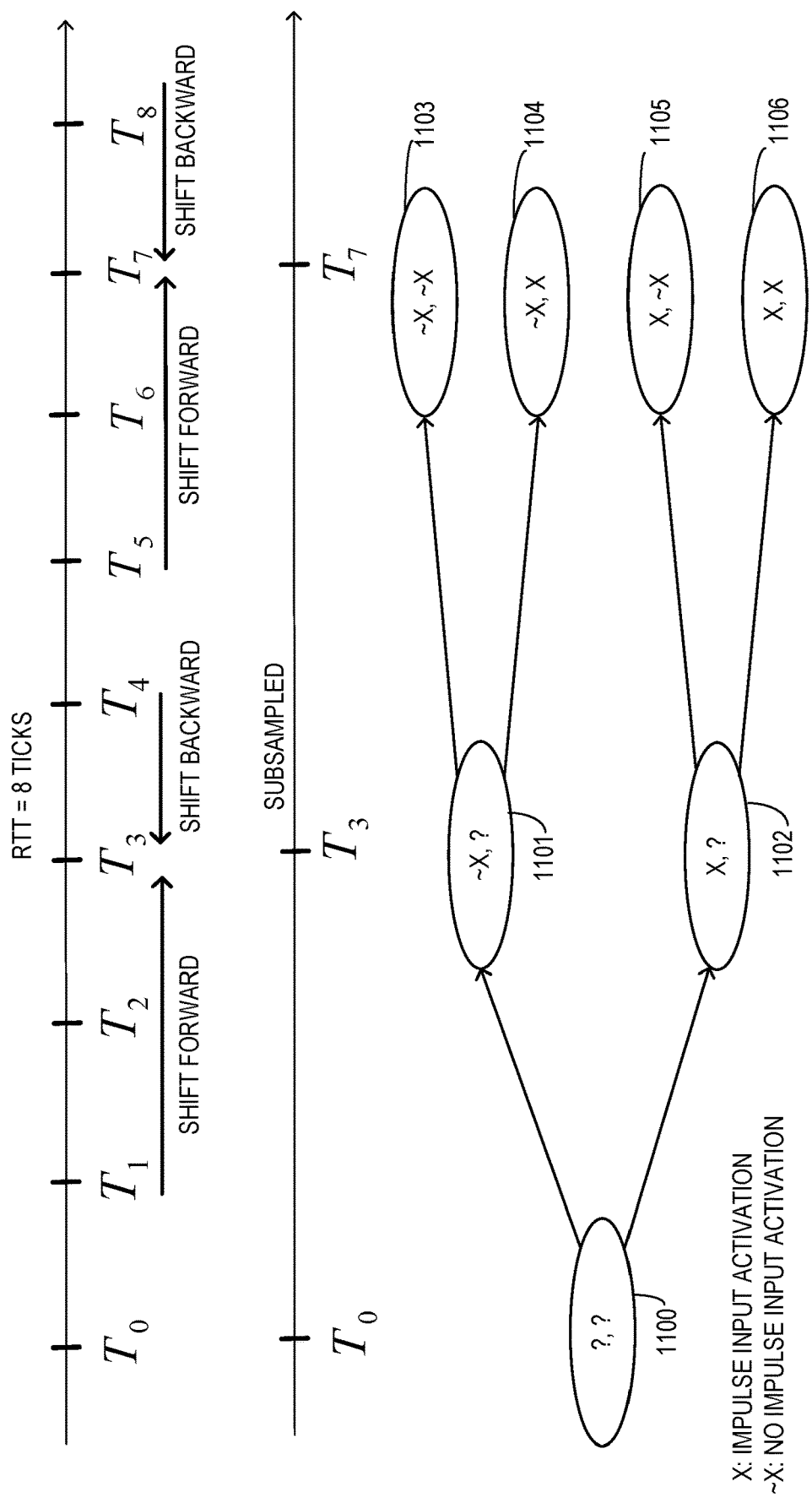
FIG. 13 is a graphical view and timeline for subsampling and time-shifting of the alternative impulse input sequences of FIG. 11.

In some embodiments, the communication lag time between the server device and the lag device may be high. In the embodiment depicted by FIG. 13, the communication lag time is an RTT of 8 clock ticks. If an impulse input activation were to be considered at each clock tick, even with only one impulse input type, the state space would be $2^8$, or 256 possible alternative impulse input sequences. In the example shown in FIG. 13, the state space is reduced by only allowing impulse input activations to occur at a subsampling periodicity that is greater than one clock tick of the server application program and the client application program. In FIG. 13, impulse input activations are only allowed to occur at $T_3$ and $T_7$, leading to a state space of $2^2$, or 4 possible alternative impulse input sequences.

Only allowing impulse input activations to occur at a subsampling periodicity larger that is greater than one clock tick of the server application program and the client application program may cause the subsequent impulse input activations received at the client device from the user input device that do not fall on a subsampled tick to be lost. The quantization logic depicted in FIG. 13 alleviates this potential loss of impulse input data by time-shifting impulse inputs either forward or backward in time to be aligned with a nearest subsampled tick. Time-shifting is possible because the alternative impulse input sequences are for future events that have not yet been displayed to the user. Accordingly, the actual impulse input from the user can be time-shifted to align with a nearest subsampled tick as long as the scene for that tick has not yet been displayed to the user. In the embodiment depicted in FIG. 13, the client device receives the four rendered scenes corresponding to alternative impulse input sequences 1103, 1104, 1105, and 1106. If for example, the actual impulse input sequence is an impulse input activation at $T_1$ and an impulse input activation at $T_8$, then the impulse input activation at $T_1$ can be time-shifted forward to occur at the subsampled tick $T_3$ and the impulse input activation at $T_8$ can be time-shifted backward to occur at the subsampled tick $T_7$. Accordingly, the rendered scene corresponding to alternative impulse input sequence 1106 that has an impulse input activation at both $T_3$ and $T_7$ may be used for reconstructing the viewport to be displayed to the user.

Figure 14:
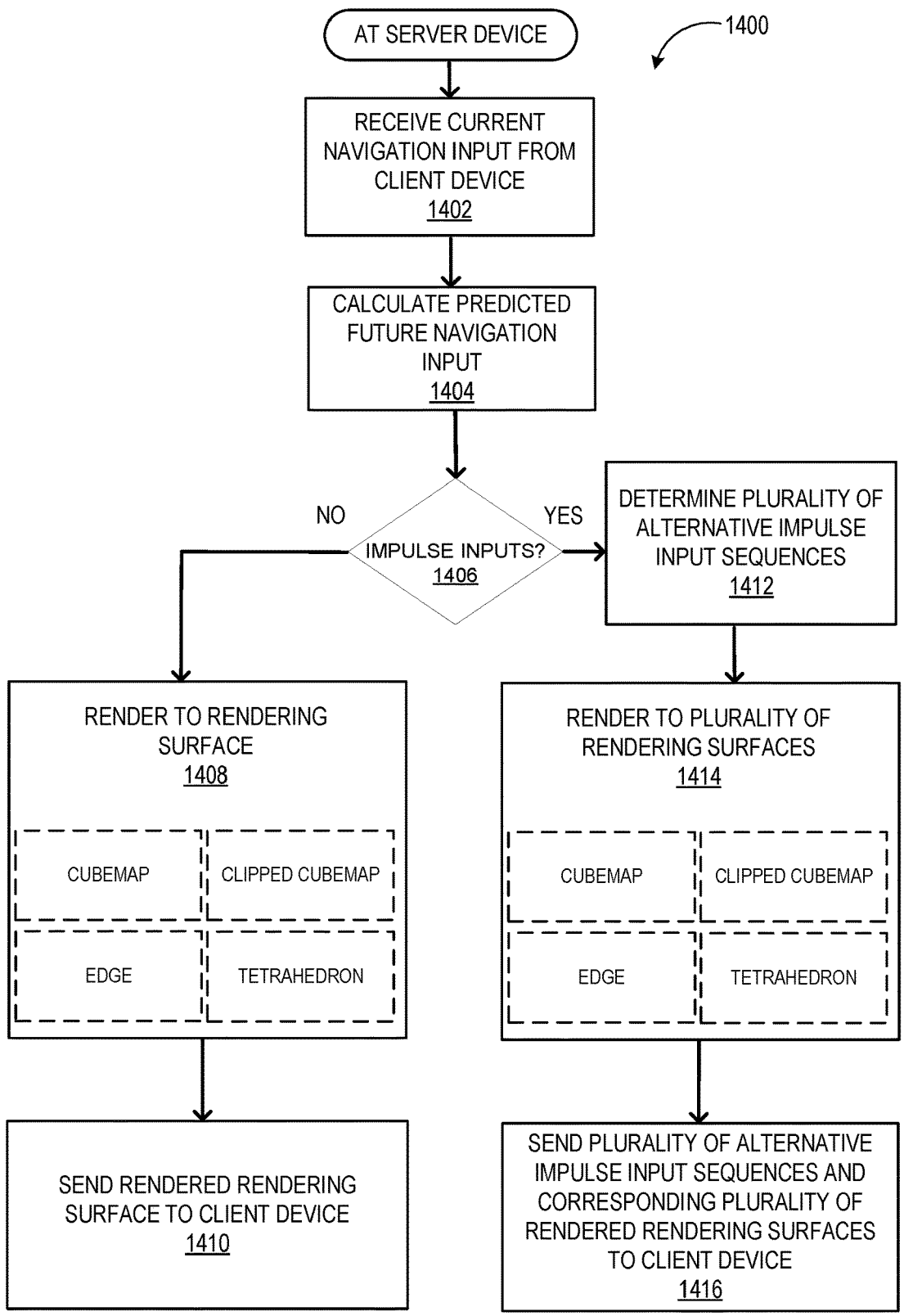
FIG. 14 is a flowchart illustrating a method for a server device configured to calculate a predicted future navigation input and render a future scene to a rendering surface.

FIG. 14 illustrates a flow chart of a method 1400 for predicting user input and rendering a future scene of an application according to an embodiment of the present disclosure. The following description of method 1400 is provided with reference to the software and hardware components of the server device 14 and the client device 12 described above and shown in FIG. 1. It will be appreciated that method 1400 may also be performed in other contexts using other suitable hardware and software components.

Method 1400 begins at 1402 and includes receiving, at a server application program executed on the server device, a current user navigation input in a stream of user navigation inputs from a client device over a network. Method 1400 advances to 1404 and includes calculating a predicted future navigation input based on the current user navigation input and a current application state of the server application program, as described above.

Method 1400 advances to 1406 including determining whether impulse inputs can be activated in the server application program. In an embodiment of the server application program that only considers navigational inputs and does not have impulse inputs, method 1400 proceeds to 1408 and includes rendering a future scene based on the predicted future navigation input to a rendering surface. The server device may render the future scene with a wider field of view than a viewport of the client application program executed on the client device. The rendering surface may be a cubemap, a clipped cubemap, an edge, or a tetrahedron as a few non-limiting examples, as discussed above. Method 1400 proceeds to 1410 and includes sending the rendered rendering surface to the client device over the network.

In another embodiment of the server application program that considers both navigational inputs and impulse inputs, method 1400 proceeds from 1404 to 1406 to 1412 and includes determining, based on the current application state of the server application program, a plurality of alternative impulse input sequences for different permutations of impulse inputs that can occur within a communication lag time between the server device and the client device. To reduce the state space of possible impulse input sequences that may occur within the communication lag time, the server device may determine impulse inputs to only occur at a subsampling periodicity that is greater than one clock tick of the server application program.

Method 1400 advances to 1414 and includes rendering a plurality of future scenes based on each of the alternative impulse input sequences and the predicted future navigation input to a plurality of rendering surfaces. The server device may render the plurality of future scenes with a wider field of view than a viewport of the client application program executed on the client device. The rendering surfaces may be a cubemap, a clipped cubemap, an edge, or a tetrahedron as a few non-limiting examples. Method 1400 proceeds to 1416 and includes sending the plurality of alternative impulse input sequences and the plurality of rendered rendering surfaces to the client device over the network.

Figure 15:
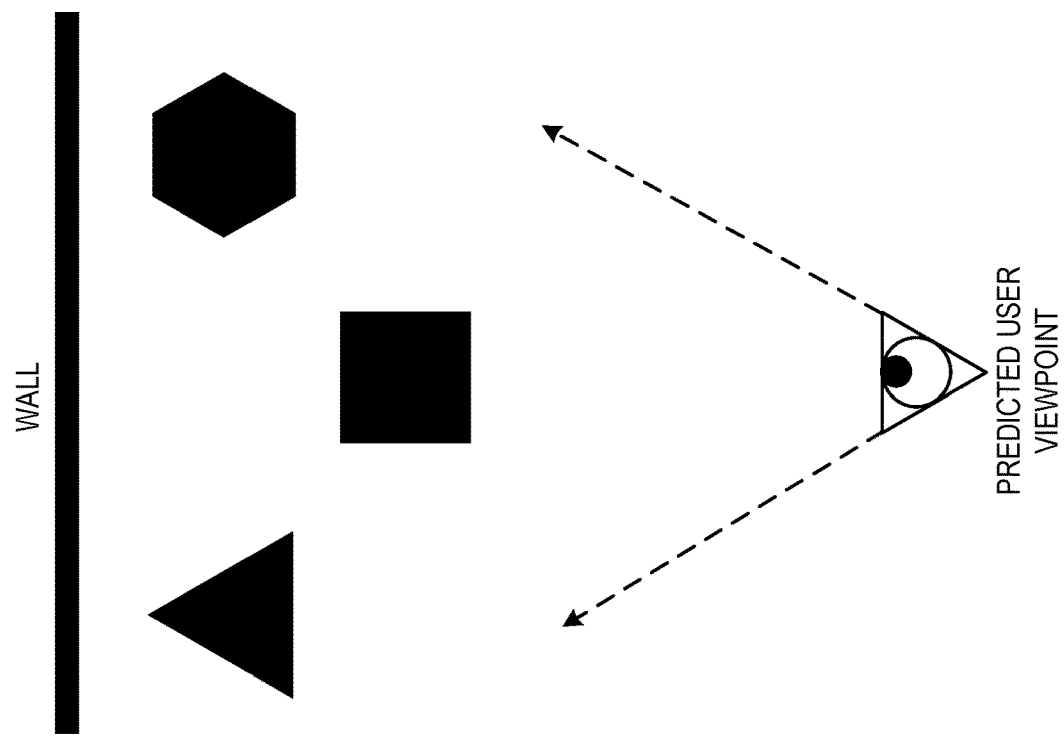
FIG. 15 is an overhead perspective view of a scene with a predicted user viewpoint to be rendered by the rendering module of FIG. 1.

Now turning to FIG. 15, an overhead view of a predicted scene having a predicted user viewpoint is illustrated. In this embodiment, the predicted scene is rendered by the server device to a rendering surface along with a depth map that contains depth information for each pixel in the rendered rendering surface, and sent to the client device. When rendered at the server device, the scene was a future scene because it was rendered based on predicted future navigation input. By the time the rendered rendering surfaces arrive at the client device, after travelling over the network for half an RTT, the scene rendered by the server device is no longer a future scene, but a predicted scene.

Figure 16:
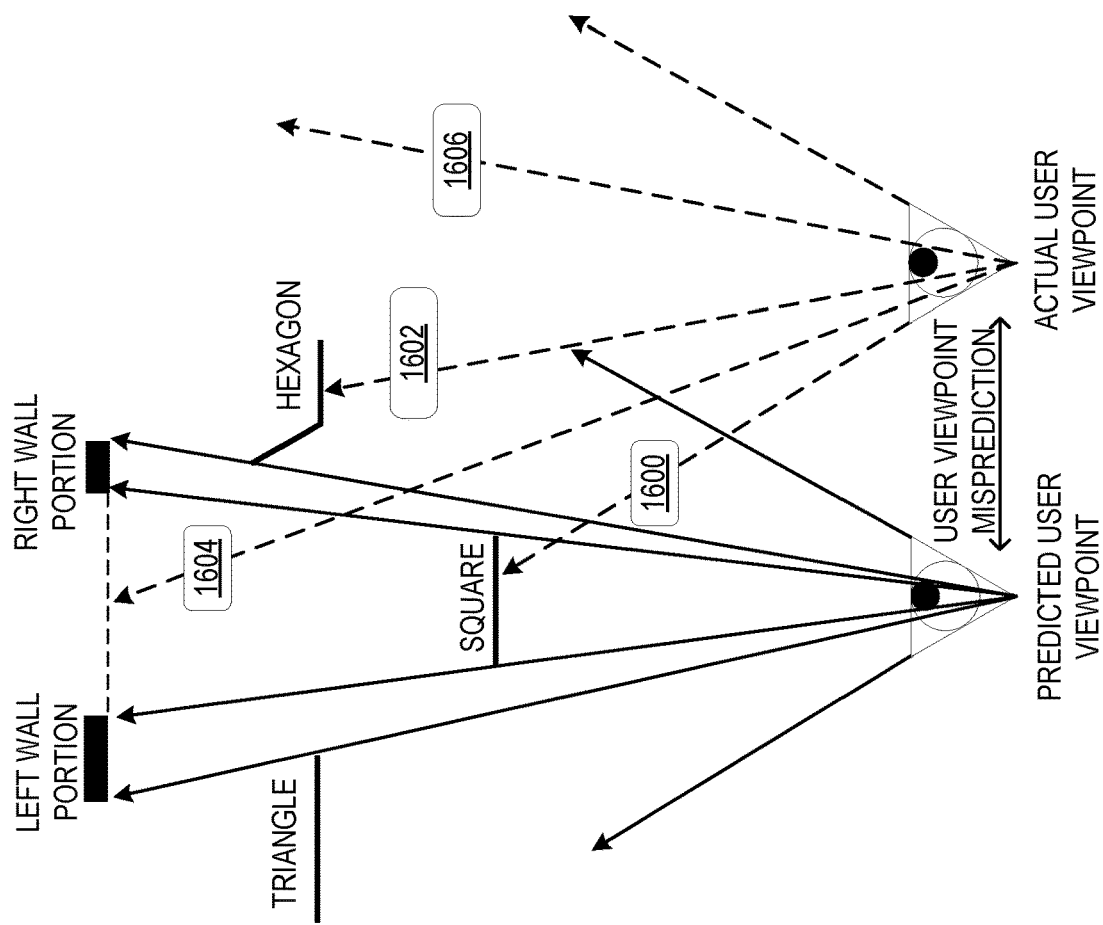
FIG. 16 is an overhead perspective view that illustrates a user viewpoint misprediction that can occur from the method of FIG. 14.

FIG. 16 depicts a combined visual of the rendered rendering surface and depth map that would be available to the client device. In this embodiment, visual information (e.g. pixel data items), are only available for the front surface of the objects as seen from the predicted user viewpoint. After receiving the subsequent user navigation input, the client device determines the actual user viewpoint based on the subsequent user navigation input. The client device can then determine the user viewpoint misprediction shown in FIG. 16, based on the predicted user viewpoint and the actual user viewpoint.

Next, the client device reconstructs a viewport for the actual user viewpoint, from the rendered rendering surface by reprojecting from the rendered rendering surface to the reconstructed viewport. In an exemplary embodiment of the client device, in order to reproject from the rendered rendering surface to the viewport for the actual user viewpoint, the client redraws the scene from the viewpoint of the actual user viewpoint using the RGBD(epth) data of the rendered rendering surface and depth map. To redraw the scene, the client device casts a ray from the actual user viewpoint to the scene defined by the rendered rendering surface and corresponding depth map. For example, ray 1600 is cast from the actual user viewpoint and intersects with a portion of the square in the predicted scene. After determining the intersection of ray 1600 and the square, the pixel information for that portion of the square that intersected with ray 1600 can be copied to a location in the reconstructed viewport corresponding to the origination point from which ray 1600 was cast. Similarly, ray 1602 also intersects with an object, the hexagon, and the pixel data items for the portion of the hexagon intersecting with ray 1602 can be copied to the reconstructed viewport in a location corresponding to the origination point of ray 1602. It will be appreciated that Ray Casting, Ray Marching, Ray Tracing, and other techniques may be used for casting the ray in the above described embodiment.

The user viewpoint misprediction shown in FIG. 16 includes a user location misprediction. Consequently in this example, the actual user viewpoint views the scene from a different angle than the predicted user viewpoint views the scene. This potentially causes the actual user viewpoint to view portions of the scene that are not viewed by the predicted user viewpoint, and therefore would not have been rendered to the rendered rendering surface in a naïve implementation of the rendering module. For example, rays 1604 and 1606 cast from the actual user viewpoint do not intersect with any locations in the rendered rendering surface and depth map, and the rendered rendering surface does not contain visual data for the locations that rays 1604 and 1606 point to, as they are pointing to areas that are not viewed by the predicted user viewpoint.

In the embodiment where the future scene is rendered to a wider field of view as shown in FIGS. 3(A)-(C) and FIGS. 4-10, ray 1606 intersects with the rendered non-displayed data outside the area viewed by the predicted user viewpoint, and the view interpolation module of the client application program on the client device to reprojects from the rendered non-displayed portions of the rendered rendering surface to the reconstructed viewport of the actual user viewpoint.

However, even in embodiments that include rendering to a wider field of view than a viewport of the client application program, there would be no visual information for ray 1604 shown in FIG. 16, as it views an area behind the square that is not viewed by the predicted user viewpoint, and would therefore not be rendered at a naïve wider field of view embodiment of the rendering module of the server device. Consequently, ray 1604 points to a void in the visual information contained within the rendered rendering surface, and reprojecting from the rendered rendering surface having the predicted user viewpoint would result in a visual hole on the reconstructed viewport corresponding to the origination point of ray 1604.

To fill any visual holes left after reprojecting from the rendered rendering surface to the reconstructed viewport of the actual user viewpoint, the view interpolation module of the client application program on the client device interpolates one or more pixel data items to fill the one or more visual holes in the reconstructed viewport using image based rendering methods. It will be appreciated that multiple image based rendering methods may be used, for example, spatial view interpolation, temporal view interpolation, depth peeling, etc. In one embodiment, a spatial view interpolation method is used, wherein a screen-space grid mesh is projected onto a depth buffer for the depth map corresponding to the rendered rendering surface of the predicted scene having the predicted user viewpoint.

FIG. 17 shows an overhead view of the predicted scene defined by the rendered rendering surface combined with the depth map, and a screen-space mesh that is projected onto the depth buffer for the depth map. In the example shown in FIG. 17, projecting the screen-space mesh results in edges 1700, 1702, 1704, and 1706. These edges occur at depth disparities in the depth buffer, where for example, there is a foreground object and a background object. In the case of edge 1700, the triangle is a foreground object and the left wall portion behind the triangle is the background object, and edge 1700 of the space-screen grid mesh extends between the two object. Similarly, edge 1702 extends between the square and the left wall portion, edge 1704 extends between the square and the right wall portion, and edge 1706 extends between the right wall portion and the hexagon.

In an exemplary embodiment, the view interpolation module casts a ray from the actual user viewpoint to the screen-space grid mesh. As shown in FIG. 17, ray 1604 is cast from the actual user viewpoint to the space-screen grid mesh and intersects with edge 1704. After determining that ray 1604 intersects with edge 1704, the view interpolation module calculates a pixel color for the pixel location on the reconstructed viewport that corresponds to the origination location of ray 1604. It will be appreciated that the pixel color can be calculated using different methods. For example, the pixel color can be calculated from a blend of a pixel color of the foreground object and a pixel color of the background object that the edge extends between, or the pixel color could be chosen from a default color used for edges. In one embodiment, the pixel color is calculated based off of only the color of the background object. It will be appreciated that Ray Casting, Ray Marching, Ray Tracing, and other techniques may be used for casting the ray in the above described embodiment.

In some embodiments, the edges of the screen-space grid mesh projected onto the depth buffer of the depth map are dilated by one or more pixels in width by applying a minimum filter over small window sizes (e.g. 5×5), such that the foreground object appears larger. Dilating the edges can help preserve the shape of the foreground object and reduce the impact of resultant visual artifact.

Figure 18:
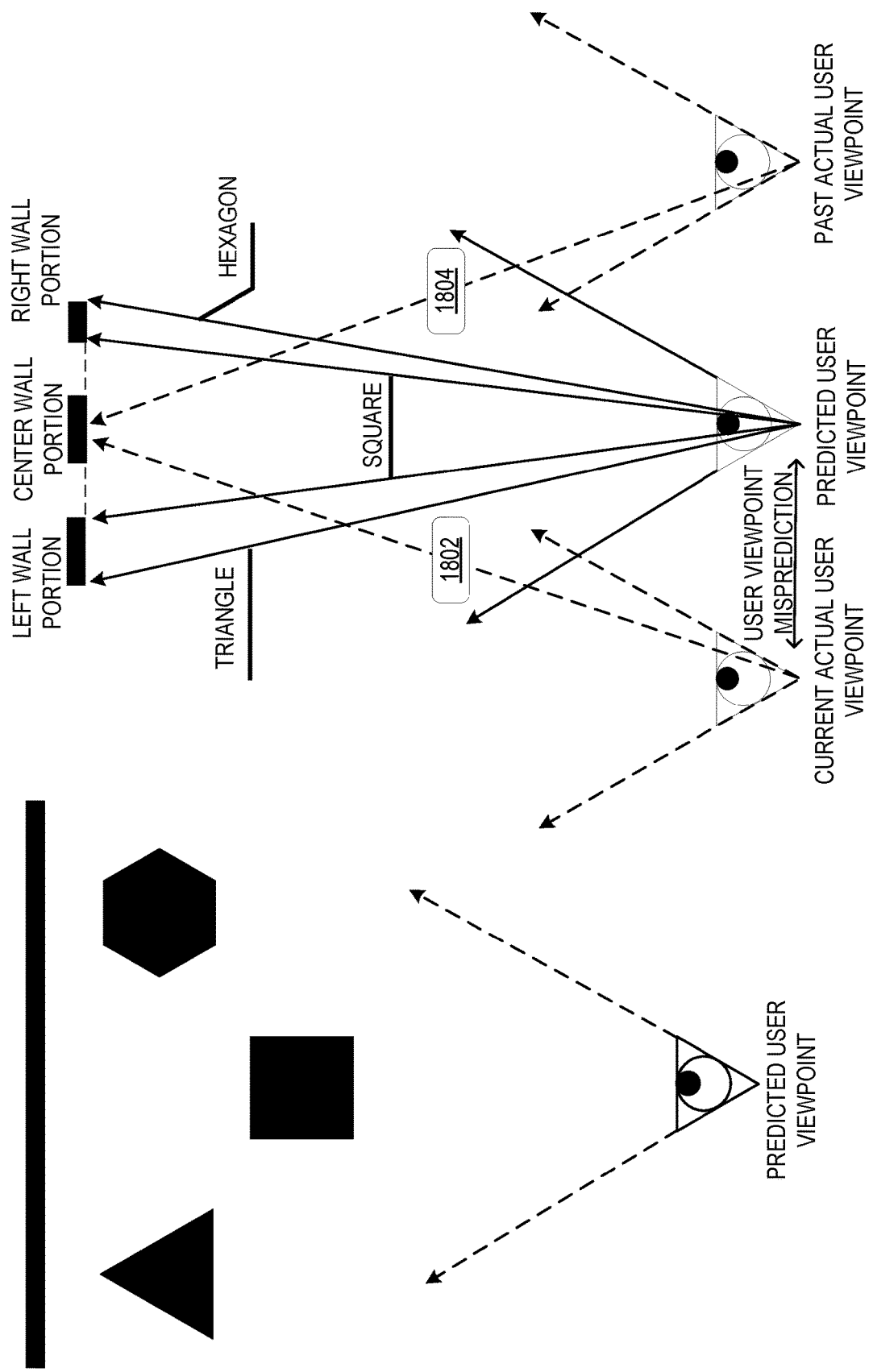
FIG. 18 is an overhead perspective view of a temporal interpolation method to fill visual holes caused by the user viewpoint midprediction of FIG. 15.

In another embodiment, the view interpolation module interpolates one or more pixel data items using a temporal view interpolation method, by reprojecting from a portion of a previously rendered viewport. An example of this embodiment is shown in FIG. 18 where the center wall portion is blocked by the square from being viewed from the predicted user viewpoint, and would not be rendered by a naïve embodiment of the rendering module. In this example, the user is moving right to left, and the server device predicts the user to move slightly to the left to the predicted user viewpoint. After receiving the rendered rendering surfaces and depth maps for the predicted user viewpoint, the client device receives the subsequent user navigation input and determines that the user actually moved farther to the left than predicted, and is actually at the current actual user viewpoint. When reconstructing a viewport for the current actual user viewpoint, the view interpolation module needs to interpolate pixel data for ray 1802 where there is a visual hole. While the center wall portion that intersects with ray 1802 is not contained within the rendered rendering surfaces of the predicted user viewpoint, the center wall portion was viewed from the past actual user viewpoint by ray 1804 and would be contained within the previously rendered viewport for the past actual user viewpoint. To interpolate the pixel data for ray 1802, the view interpolation module reprojects from a portion of the previously rendered viewport of the past actual user viewpoint that contains pixel data items for the center wall portion that intersects with ray 1802.

FIG. 19 depicts an embodiment that uses depth peeling to render a composite of a plurality of depth layers. In the example shown in FIG. 19, three depth layers are rendered into a composite rendering surface. The first depth layer contains pixel data items for the background wall, the second depth layers contains pixel data items for the front surfaces of the triangle and hexagon, and the third depth layer contains pixel data items for the front surface of the square. After determining the user viewpoint misprediction, an embodiment of the view interpolation module of the client device reprojects from the composite depth layer rendering surface to a viewport for the actual user viewpoint. When reprojecting, the view interpolation module may cast rays from the actual user viewpoint to the rendering surface that is a composite of a plurality of depth layers. For example, ray 1904 cast from the actual user viewpoint intersects with the hexagon in depth layer 2 and the wall in depth layer 3. As pixel data items are available for both the wall and the hexagon, the view interpolation module determines that the hexagon is in front of the wall as viewed from the actual user viewpoint, and reprojects the pixel data items for the hexagon to the viewport for the actual user viewpoint and discards the pixel data items for the portion of the wall that is behind the hexagon. Ray 1902 cast from the actual user viewpoint does not intersect with any of the objects in depth layer 1 or 2, only intersecting with the wall in depth layer 3. Accordingly, the view interpolation module can just reproject the pixel data items for the portion of the wall intersecting with ray 1902 to the viewport for the actual user viewpoint. It will be appreciated that the portion of the wall intersecting with ray 1902 is not viewed from the predicted user viewpoint, but is nonetheless rendered at the server device in depth layer 3 of the composite of the plurality of depth layers rendered to the rendering surface that is sent to the client device.

In one embodiment of the above configuration, the number of depth layers in the plurality of depth layers rendered to the rendering surface does not exceed an adjustable threshold value. Some objects or scenes may have complex depth profiles, and have a potentially large number of depth layers (e.g. foliage or a particle system). The large number of depth layers could lead to potentially unbounded memory requirements. By limiting the number of potential depth layers to a threshold value, the problem of potentially unbounded memory requirements is prevented.

Figure 20:
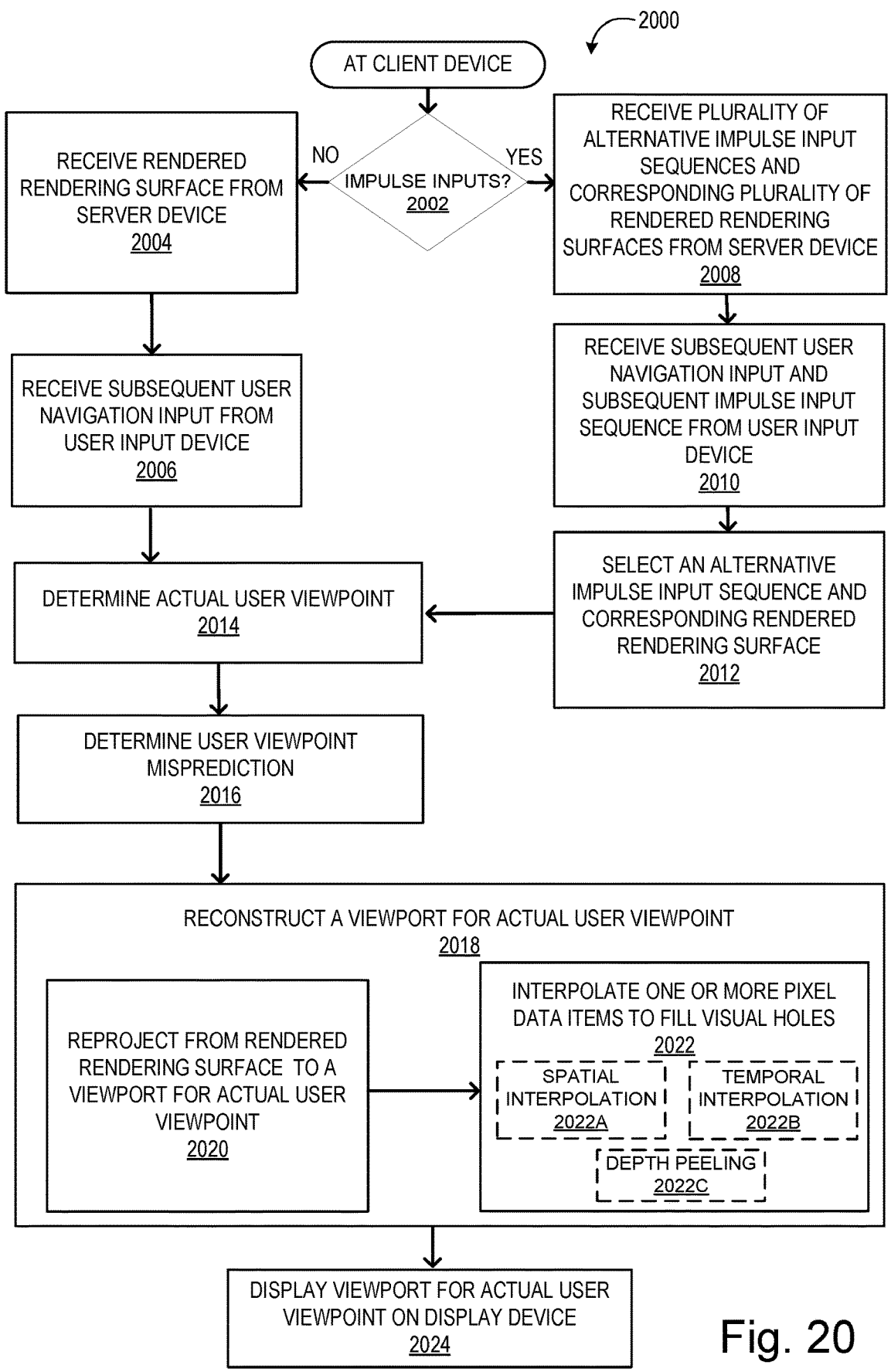
FIG. 20 is a flowchart illustrating a method for a client device configured to reconstruct a viewport for an actual user viewpoint from the rendered rendering surface of FIG. 1.

FIG. 20 illustrates a flow chart of a method 2000 for reconstructing a viewport for an actual user viewpoint according to an embodiment of the present disclosure. The following description of method 2000 is provided with reference to the software and hardware components of the server device 14 and the client device 12 described above and shown in FIG. 1. It will be appreciated that method 2000 may also be performed in other contexts using other suitable hardware and software components.

Method 2000 begins at 2002 and includes determining whether the client application program executed on the client device includes impulse inputs. If the client application program only allows for navigational inputs to be entered and not impulse inputs, then method 2000 proceeds to 2004 and includes receiving, from a server device over a network, a rendered rendering surface of a predicted scene having a predicted user viewpoint, wherein the rendered rendering surface has a wider field of view than a viewport of the client application program and includes a plurality of non-displayed rendered pixel data items in regions not displayed in the viewport of the client application program centered at the predicted user viewpoint.

Method 2000 advances to 2006 and includes receiving a subsequent user navigation input in a stream of user input. Upon receiving the subsequent user navigation input, method 200 proceeds to 2014 and includes determining an actual user viewpoint based on the subsequent user navigation input. Next, method 2000 advances to 2016 and includes determining a user viewpoint misprediction based on the predicted user viewpoint and the actual user viewpoint.

Upon determining that there was a user viewpoint misprediction, method 2000 proceeds to 2018 and includes reconstructing a viewport for the actual user viewpoint from the rendered rendering surface, wherein the viewport for the actual user viewpoint includes a portion of the plurality of non-displayed rendered pixel data items. It will be appreciated that the portion of the plurality of non-displayed rendered pixel data items that are included in the viewport for the actual user viewpoint will be displayed to the user, while the remaining portion of the plurality of non-displayed rendered pixel data items that were not included in the viewport for the actual user viewpoint will remain undisplayed.

During reconstruction step 2018, method 2000 proceeds through sub-steps 2020 and 2022. Step 2020 includes reprojecting from a portion of the rendered rendering surface to the viewport for the actual user viewpoint. It will be appreciated that after reprojection, visual holes may remain in the viewport for the actual user viewpoint due to the user viewpoint misprediction as described above. To fill these visual holes, method 2000 advances to step 2022 and includes interpolating one or more pixel data items to fill one or more visual holes in the reconstructed viewport. It will be appreciated that the one or more pixel data items may be interpolated through multiple different methods, for example through spatial interpolation, temporal interpolation, or depth peeling.

One example manner of accomplishing step 2022 uses spatial interpolation, as illustrated at substep 2022A. At substep 2022A, the method may include projecting a screen-space grid mesh onto a depth buffer for a depth map corresponding to the rendered rendering surface of the predicted scene. The screen-space grid mesh may include an edge that extends between a foreground object and a background object in the predicted scene. Next, substep 2022A may include dilating the edge in the screen-space grid mesh by one or more pixels in width. Then, substep 2022A may include casting a ray from the actual user viewpoint to the screen-space grid mesh. Next, substep 2022A determining that the ray intersects with the edge in the screen-space grid mesh. Finally, substep 2022A may include calculating a pixel color for the interpolated one or more pixel data items based on a color of the background object in the predicted scene. It will be appreciated that when casting a ray, Ray Casting, Ray Marching, Ray Tracing, and other ray techniques may be used.

Another substep of step 2022 that uses temporal interpolation includes reprojecting from a portion of a previously rendered viewport is illustrated at substep 2022B. A substep of step 2022 that uses depth peeling is illustrated at 2022C, and includes reprojecting from the rendered rendering surface. According to substep 2022C, the rendered rendering surface may be a composite of a plurality of depth layers, and a number of depth layers in the plurality of depth layers typically does not exceed an adjustable threshold value.

After reconstructing the viewport for the actual user viewpoint, method 2000 proceeds to step 2024 including displaying the viewport for the actual user viewpoint on a display device.

Turning back to step 2002, if the client application program includes impulse inputs, then method 2000 advances to step 2008 and includes receiving, from a server device over a network, a plurality of alternative impulse input sequences and a plurality of rendered rendering surfaces corresponding to the plurality of alternative impulse input sequences. It will be appreciated that the plurality of rendered rendering surfaces may have each been rendered with the predicted user viewpoint and with a wider field of view than a viewport of the client application program and include a plurality of non-displayed rendered pixel data items in regions not displayed in the viewport of the client application program centered at the predicted user viewpoint.

Method 2000 advances to step 2010 and includes receiving a subsequent user navigation input and a subsequent impulse input sequence in the stream of user input. Next, method 2000 proceeds to 2012 and includes selecting an alternative impulse input sequence from the plurality of alternative impulse input sequences based on the subsequent impulse input sequence and selecting a rendered rendering surface from the plurality of rendered rendering surfaces corresponding to the selected alternative impulse input sequence. It will be appreciated that this selections may be made using a variety of criterions. In one embodiment, the alternative impulse input sequence that matches the subsequent impulse input sequence is selected. In other embodiments, the alternative impulse input sequence that is closest to the subsequent impulse input sequence is selected. It will also be appreciated that the alternative impulse input sequences may have been determined accordingly with a subsampled periodicity that is greater than one clock tick of the client application program. In such an embodiment, method 2012 may include time-shifting each impulse input of the subsequent impulse input sequence to a nearest subsampled tick of the plurality of alternative impulse input sequences before selecting an alternative impulse input sequence.

Upon selection of an alternative impulse input sequence and a corresponding rendered rendering surface, method 2000 proceeds through steps 2014, 2016, 2018, 2020, 2022, and 2024 in the same manner as described above.

Figure 21:
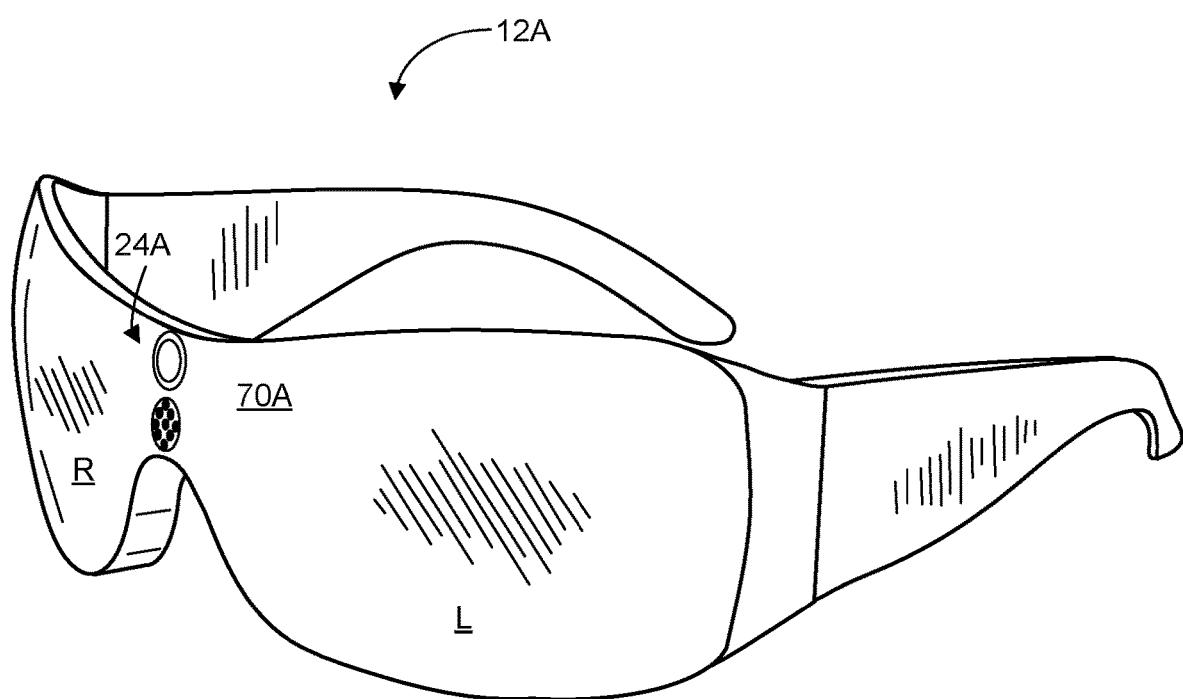
FIG. 21 is an illustration of a head mounted display embodiment of the client device of FIG. 1.

As shown in FIG. 21, the client device 12 described above may include a stereoscopic display 70A. In an exemplary embodiment, the stereoscopic display 70A may be included in a client device 12A in the form of a head mounted display (HMD). The stereoscopic display 70A of the HMD client device 12A has a left display L and a right display R each of which projects images to the respective left and right eye of the user wearing the HMD. The HMD client device 12A may receive user input through a user input device 24A such as sensors mounted on the device (e.g. gyroscopes, accelerometers, RGB camera, depth camera, etc.). The HMD client device may send the data received from the mounted sensors to the server device over the network. In one embodiment, the HMD client device receives predictive content from a server device that implements method 1400 for both a predicted user left eye viewpoint and a predicted user right eye viewpoint. The predictive content may be a rendered rendering surface and depth map, or a plurality of rendered rendering surfaces and depth maps and a plurality of alternative impulse input sequences. In this embodiment, the HMD client device executes method 2000 twice to reconstruct a viewport for the actual user viewpoint of the user's left eye from the predictive content corresponding to the user's left eye, and reconstructs a viewport for the actual user viewpoint of the user's right eye from the predictive content corresponding to the user's right eye.

In another embodiment, to reduce bandwidth consumption, the server device only executes method 1400 for the predicted user viewpoint of a user's first eye. The server device may alternate the first eye between the user's left eye and the user's right eye at each rendering pass, such that the HMD client device receives predictive content that alternates between a predicted user viewpoint of the user's left eye and a predicted user viewpoint of the user's right eye. In this embodiment, the HMD client device executes the method 2500 to reconstruct both a viewport for the actual user viewpoint of the user's first eye and a second viewport for the actual user viewpoint of the user's second eye based on current predictive content that was just received from the server device and previous predictive content that was previously received from the server device. It will be appreciated that in this embodiment, the current predictive content was rendered from the predicted user viewpoint of a first eye, and the previous predictive content was rendered from the predicted user viewpoint of a second eye. It will be further appreciated that the predictive content may be a rendered rendering surface, or a plurality of rendered rendering surfaces and a plurality of alternative impulse input sequences produced by the server device according to method 1400.

Now turning to FIG. 22, the stereoscopic display utilizes two rendered viewports for display, one for the left eye of the user and one for the right eye of the user. In the example illustrated in FIG. 22, the server device sent a rendered rendering surface and depth map of a scene having a user viewpoint for a first eye. In this example, the first eye is the left eye of the user and there was no user viewpoint misprediction, such that the actual user viewpoint for the left eye matches the predicted user viewpoint for the left eye. Accordingly, a viewpoint for the left eye can be constructed through a simple projection of the scene represented by the rendered rendering surface onto the viewport for the left eye. However, the viewpoint for the second eye, which is the right eye of the user, is translated to the right of the first eye viewpoint by an interpupillary distance, the distance between the pupils of the user wearing the HMD client device. As, in this example, the HMD client device only has a current rendered rendering surface for the left eye, the HMD client device needs to interpolate the viewport for the second eye based on the rendered rendering surface having a user viewpoint for the first eye. Accordingly, the view interpolation module of the HMD client device reprojects the scene to the viewport for the second eye using the rendered content of the rendered rendering surface having a user viewpoint for the first eye.

In the example illustrated in FIG. 22, the view interpolation module casts rays from the user viewpoint for the second eye to the scene represented by the rendered rendering surface having a user viewpoint for the first eye. Rays 2500 and 2502 intersect with locations in the scene that are contained within the rendered content of the rendered rendering surface. Accordingly, the pixel data items from the rendered rendering surface corresponding to the locations intersecting with rays 2500 and 2502 can be added to the viewport of the second eye at locations corresponding to the origination points of rays 2500 and 2502. It will be appreciated that Ray Casting, Ray Marching, Ray Tracing, and other techniques may be used for casting the ray in the above described embodiment.

However, rays 2504 and 2506 point to locations that are not contained within the rendered content of the rendered rendering surface having a user viewpoint for the first eye. In one embodiment, the view interpolation module of the HMD client device interpolates pixel data items to fill these visual holes left by the rays that do not intersect with rendered content in the rendered rendering surface. It will be appreciated that pixel data items for the visual holes for ray 2504 can be interpolated using the spatial view interpolation method shown in FIG. 17 with ray 1604, the temporal view interpolation method shown in FIG. 18 with ray 1804, and the depth peeling method shown in FIG. 19 with ray 1902. The visual hole corresponding to ray 2506 can be interpolated in embodiments of the HMD client device that receives rendered rendering surfaces having a wider field of view than a viewport of the HMD client device, as shown in FIG. 3A, FIG. 3B, and FIG. 3C.

In the embodiment where the server device alternates between rendering the scene from the user viewpoint for the left eye and user viewpoint for the right eye, the HMD client device synthesizes the viewport for the second eye based on not only a current rendered rendering surface representing a current view of a scene for a first eye of the user, but also a previously rendered rendering surface representing a past view of the scene for a second eye of the user. It will be appreciated that because the server device is alternating between eyes after each rendering pass in this embodiment, the past view of the scene represented by the previously rendered rendering surface will only be on the order of 30-100 ms in the past. It will also be appreciated that the server device may alternate between the left eye and then right eye according to other periodicities, such as every two or three rendering passes.

Figure 23:
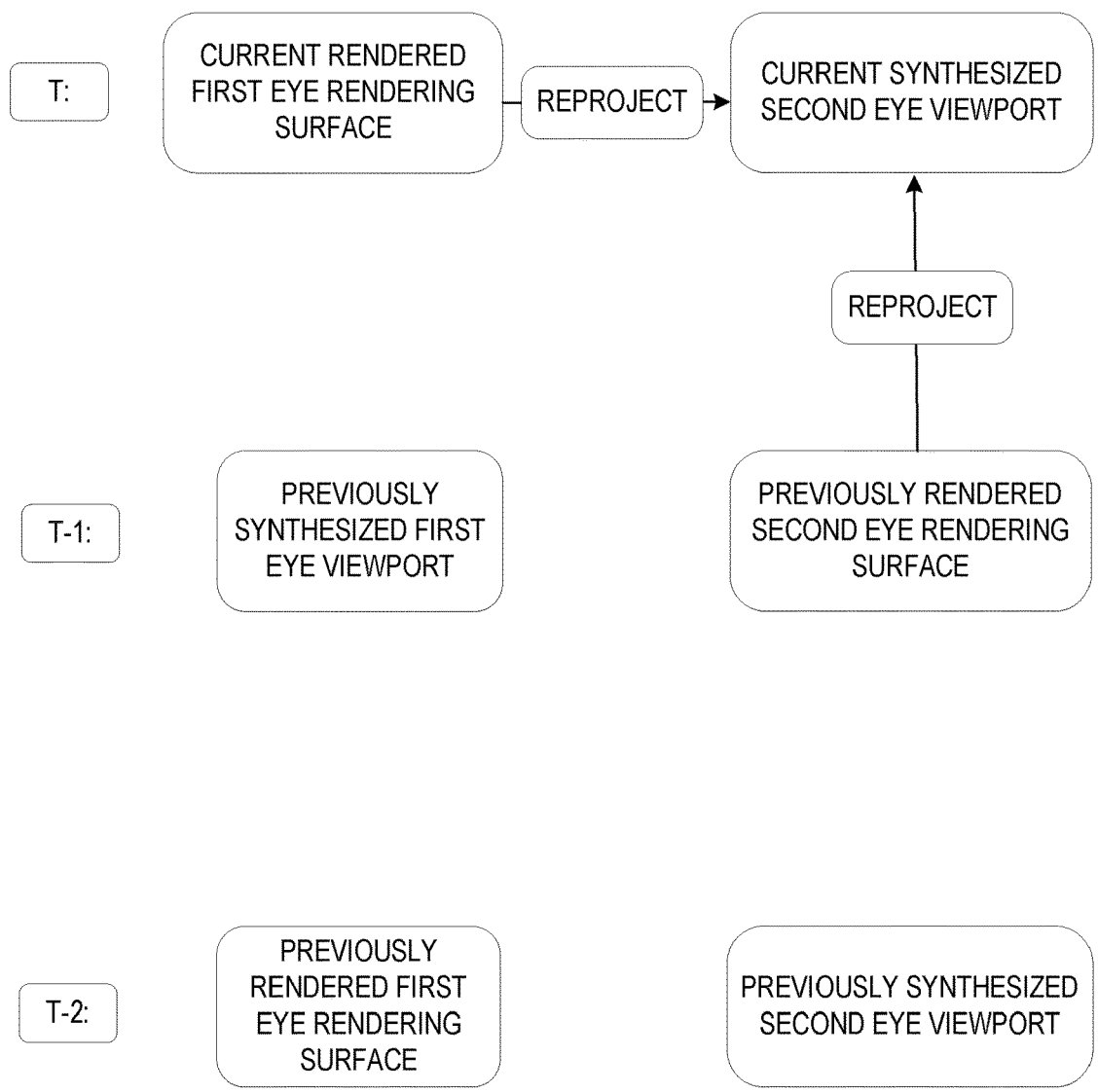
FIG. 23 is a graphical view of an interleaving method for synthesizing the viewport for a second eye for FIG. 22.

In the example depicted in FIG. 23, the server renders a scene from the user viewpoint of the first eye and sends a current rendered first eye rendering surface to the HMD client device. At the HMD client device, the view interpolation module reprojects from the current rendered first eye rendering surface to a current synthesized second eye viewport. After this first reprojection, there may be visual holes left in the current synthesized second eye viewport, as described in the example in FIG. 22. These visual holes are filled by reprojecting from a previously rendered second eye rendering surface to the current synthesized second eye viewport. It will be appreciated that in this embodiment, the current rendered first eye rendering surface and the previously rendered second eye rendering surface were rendered at the server device, and do not contain interpolated or reconstructed data that may have visual artifacts. It will be further appreciated that the rendering surfaces may be many kinds of shapes, such cubemaps, clipped cubemaps, edges, tetrahedrons, or rectangles, as a few non-limiting examples.

The visuals holes that arise after reprojection from the current rendered first eye rendering surface due to depth disparity and interpupillary distance as described in FIG. 22 are not correlated with the visual holes that arise after reprojection from the previously rendered second eye rendering surface due to a change in user viewpoint over time. Reprojection from the current rendered first eye rendering surface will tend to cause visual holes in the current synthesized second eye viewport where there is a large depth disparity in the scene as shown in FIG. 22. In some embodiments, the server device extrudes a depth map for each rendered rendering surface. In these embodiments, the depth disparity in the scene can be detected by the HMD client device based on the depth map. It will be appreciated that the depth map may be transmitted to the HMD client device as a depth buffer, or any other suitable data structure for depth maps.

Turning back to FIG. 22, an example of a large depth disparity in the depth map is the depth disparity between the square and the wall. This depth disparity, combined with the interpupillary distance between the first eye and the second, causes there to be a visual hole when reprojecting from the current rendered first eye rendering surface to the current synthesized second eye viewport in a location on the current synthesized second eye viewport corresponding to the origination point of ray 2504. Accordingly, visual holes are likely to arise at locations with large depth disparities, and these visual holes can be efficiently detected based on locations of the large depth disparities. In some embodiments, the visual holes are recorded during the reprojection process when a ray is determined to not intersect with rendered content in the rendered rendering surface being reprojected.

Reprojection from the previously rendered second eye rendering surface will cause visual holes in the current synthesized second eye viewport when a rate of change of user viewpoint is high. In some embodiments, the rate of change of user viewpoint is calculated based on the stream of user input received from the user (e.g. total head rotation distance over one RTT). It will be appreciated that if the rate of change of user viewpoint is low or zero (e.g. user has not recently entered a navigational input), then the previously rendered second eye rendering surface will have the same user viewpoint for the second eye as the current synthesized second eye viewport. Accordingly, if the rate of change of user viewpoint is low or zero, reprojection from the previously rendered second eye rendering surface to the current synthesized second eye viewport will result in minimal visual holes.

Figure 24:
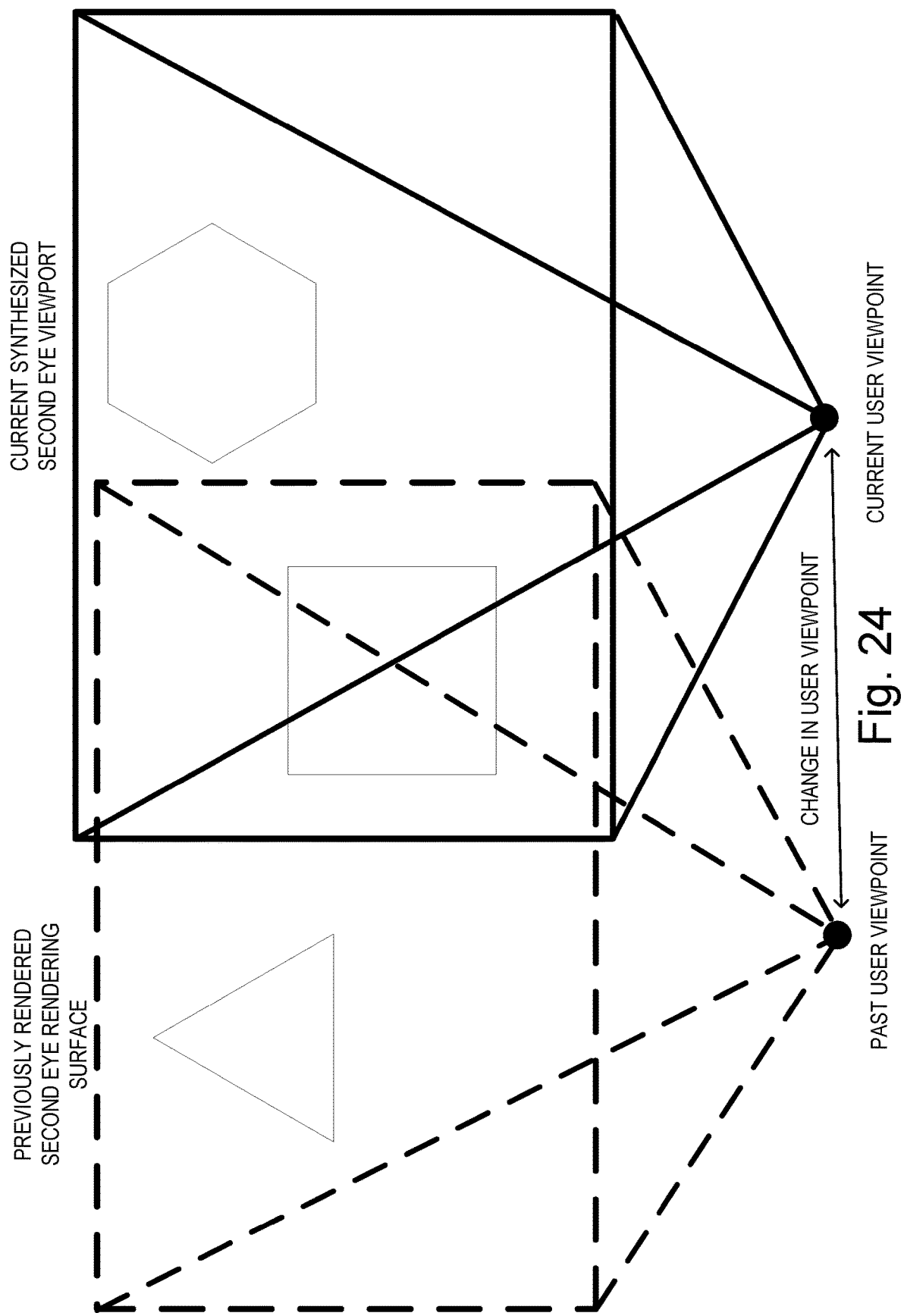
FIG. 24 is a graphical view illustrating visual holes that may arise from the interleaving method of FIG. 23.

FIG. 24 illustrates an example where the rate of change of user viewpoint is high. In this example, the user has quickly moved to the right. Accordingly, the current user viewpoint is far to the right of the past user viewpoint. In this example, the previously rendered second eye rendering surface is a rectangle the same size as the viewport of the client application program executed on the HMD client device. Reprojecting from the previously rendered second eye rendering surface to the current synthesized second eye viewport will result in visual holes corresponding to the portion of the synthesized second eye viewport containing the hexagon, because there is no rendered content in the previously rendered rendering surface corresponding to the portion of the synthesized second eye viewport that contains the hexagon, due to the high rate of change of user viewpoint.

After reprojection from the previously rendered second eye rendering surface to the current synthesized second eye viewport, there may still be remaining visual holes in the current synthesized second eye viewport. In some embodiments, these remaining visual holes are filled using screen-space color picking from the previously rendered second eye rendering surface. In these embodiments, the view interpolation module of the HMD client device may determine the locations in the current synthesized second eye viewport that are visual holes, and copy pixel data from corresponding locations in the previously rendered second eye rendering surface.

Figure 25:
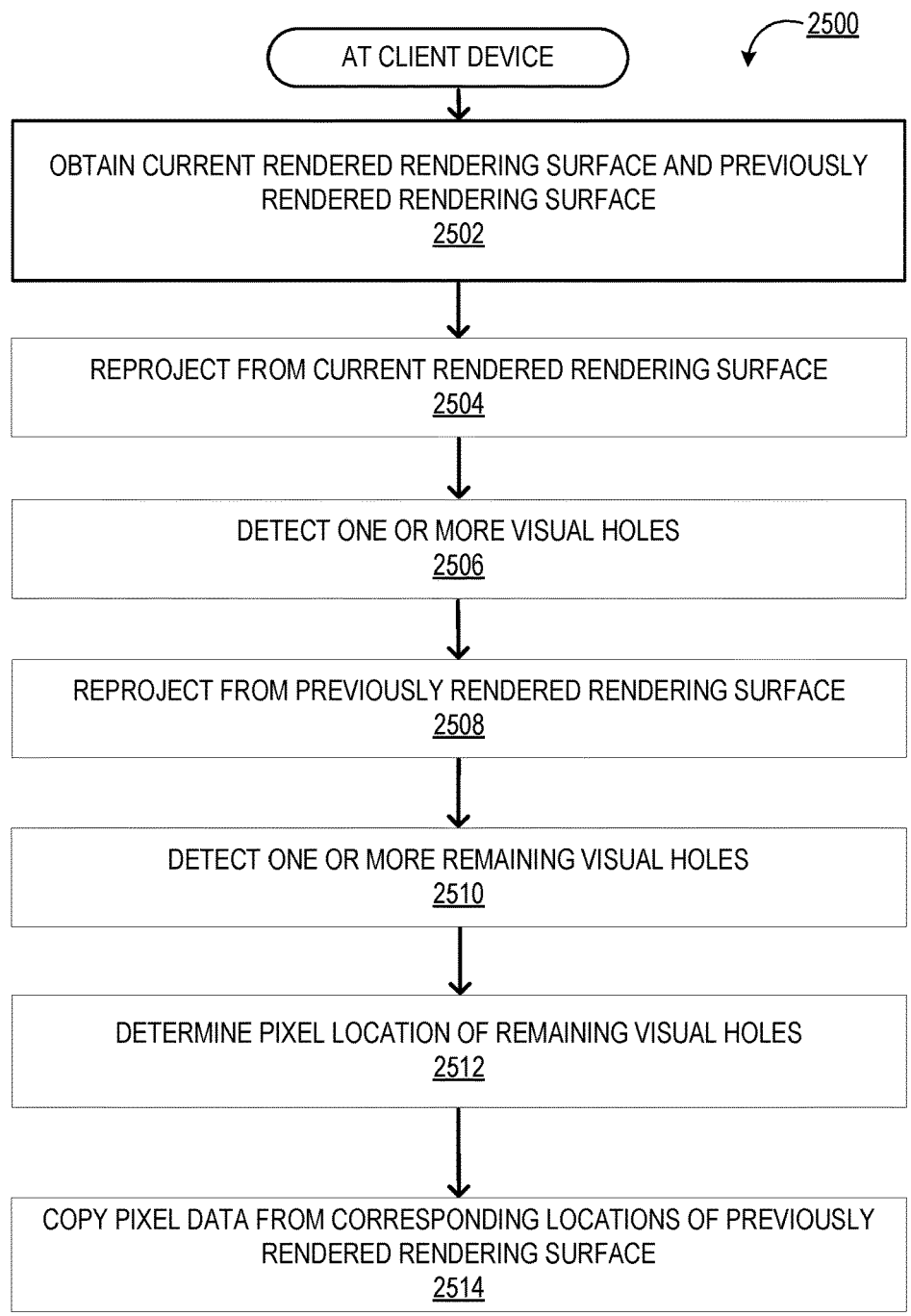
FIG. 25 is a flowchart illustrating a method for a client device configured to synthesize a viewport for a second eye from a rendered rendering surface having a user viewpoint for a first eye.

FIG. 25 illustrates a flow chart of a method 2500 for interpolating a current second eye viewport for stereoscopic vision according to an embodiment of the present disclosure. The following description of method 2500 is provided with reference to the software and hardware components of the server device 14 and the client device 12 described above and shown in FIG. 1. It will be appreciated that method 2500 may also be performed in other contexts using other suitable hardware and software components.

Method 2500 begins at 2502 and includes obtaining, at a view interpolation module of the client application program, a current rendered rendering surface representing a current view of a scene for a first eye of a user and a previously rendered rendering surface representing a past view of the scene for a second eye of the user. It will be appreciated that the current rendered rendering surface and the previously rendered rendering surface may be rendered with a wider field of view than a viewport of the client device. Additionally, the rendering surfaces may be many kinds of shapes such as cubemaps, clipped cubemaps, edges, or tetrahedrons as a few examples. It will be further appreciated that the first eye being rendered at each rendering pass may alternate between the left eye of the user and the right eye of the user. In one embodiment, this rendering process may be completed on a server device that sends the rendered rendering surfaces to a client device that enacts method 2500. In another embodiment, the server device may render predicted scene according to method 1400, and send the rendered rendering surfaces of predicted scenes for a predicted viewpoint of either a left eye or a right eye of the user to the client device over a network.

Next, the view interpolation module synthesizes a current second eye viewport representing a current view of the scene for the second eye of the user based on the current rendered rendering surface and the previously rendered rendering surface. This synthesis is accomplished in the remaining steps of method 2500. Method 2500 proceeds to 2504 and includes reprojecting from the current rendered rendering surface to the current second eye viewport.

Method 2500 advances to 2506 and includes detecting one or more visual holes in the current second eye viewport. In one embodiment, detecting one or more visual holes in the current second eye viewport is based on a detected depth disparity in a depth map for the current rendered rendering surface, the depth map being obtained at the view interpolation module of the client application program. Next, method 2500 interpolates one or more pixel data items for the one or more visual holes based on the previously rendered rendering surface.

Method 2500 interpolates one or more pixel data items by proceeding to 2508 and includes reprojecting from the previously rendered rendering surface to the current second eye viewport. Method 2500 advances to 2510 and includes detecting one or more remaining visual holes in the current second eye viewport after reprojection from the previously rendered rendering surface. In one embodiment, detecting one or more remaining visual holes is based on a calculated rate of change in user viewpoint that is calculated based on a stream of user input received from the user. Next, method 2500 fills the one or more remaining visual holes based on the previously rendered rendering surface.

Method 2500 fills the one or more remaining visual holes by proceeding to 2512 and includes determining a pixel location in the current second eye viewport for each of the one or more remaining visual holes. Method 2500 advances to 2514 and includes copying pixel data from pixel locations in the previously rendered rendering surface corresponding to the pixel location in the current second eye viewport of each of the one or more remaining visual holes. In one embodiment, the pixel data is directly copied from the previously rendered rendering surface into the corresponding location in the current second eye viewport.

In some embodiments, method 2500 is combined with method 2000 for embodiments of the HMD client device that receive predictive rendered content from the server device. In these embodiments, the server device renders content according to method 1400, alternating between a left eye and right eye of the user. The HMD client device receives a current rendered rendering surface of a predicted scene having a predicted user viewpoint for a first eye of a user and obtains, at a view interpolation module of the client application program, a previously rendered rendering surface of a previously predicted scene having a previously predicted user viewpoint for a second eye of the user. In some embodiments, the previously rendered rendering surface is obtained from memory HMD client device.

Next, the HMD client device receives, from the user input device, a subsequent user navigation input in the stream of user input. Then, determines an actual user viewpoint for the first eye and an actual user viewpoint for the second eye based on the subsequent user navigation input. The HMD client device then proceeds to determine a user viewpoint misprediction based on the predicted user viewpoint for the first eye and the actual user viewpoint for the first eye. It will be appreciated that the first eye in this embodiment is the eye that the server device rendered to the rendering surface, and was received by the HMD client device as a current rendered rendering surface. If there is a user viewpoint misprediction, the HMD client device cannot simply project the rendered rendering surface to the viewport for the first eye, but needs to use view interpolation to reconstruct a first viewport for the actual user viewpoint for the first eye of the user from the current rendered rendering surface. To reconstruct the first viewport for the actual user viewpoint, the HMD client device may use method 2000 or a combination of steps contained in method 2000.

Next, the HMD client device proceeds to synthesize a second viewport for the actual user viewpoint for the second eye of the user based on the current rendered rendering surface and the previously rendered rendering surface. To synthesize the second viewport for the actual user viewpoint, the HMD client device may use method 2500 or a combination of step contained in method 2500. It will be appreciated that the actual user viewpoint for the second eye of the user will be translated to the left or right of the actual user viewpoint for the first eye by the interpupillary distance. It will be further appreciated that the previously predicted viewpoint for the second eye of the user of the previously rendered rendering surface was predicted for a past user viewpoint for the second eye, and not for the current user viewpoint for the second eye. However, method 2500 can still be applied using the previously rendered rendering surface and the current rendered rendering surface.

After reconstructing the first viewport for the first eye and synthesizing the second viewport for the second eye, the HMD client device proceeds to display the first viewport and the second viewport on the stereoscopic display device. It will be appreciated that the above embodiment that combines methods 2000 and 2500 is not limited to HMD client device. The above embodiment can also be applied to a desktop computer with a stereoscopic screen as another non-limiting example.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 1 schematically shows a non-limiting embodiment of a computing system 10 that can enact one or more of the methods and processes described above. Computing system 10 is shown in simplified form. Computing system 10 may take the form of one or more personal computers, server computers, tablet computers, home-entertainment computers, network computing devices, gaming devices, mobile computing devices, mobile communication devices (e.g., smart phone), and/or other computing devices.

Computing system 10 includes a logic machine 18 on client device 12 and a logic machine 28 on server device 14. Computing system 10 also includes and a storage machine 22 on client device 12 and a storage machine 32 on server device 14. Computing system 10 may optionally include a display subsystem 70, input subsystem 24, and/or other components not shown in FIG. 1.

Logic machines 18 and 28 include one or more physical devices configured to execute instructions. For example, the logic machines may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machines may include one or more processors configured to execute software instructions. Additionally or alternatively, the logic machines may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machines optionally may be distributed among two or more separate devices, which may be remotely located and/or configured for coordinated processing. Aspects of the logic machines may be virtualized and executed by remotely accessible, networked computing devices configured in a cloud-computing configuration.

Storage machines 22 and 32 include one or more physical devices configured to hold instructions executable by the logic machines to implement the methods and processes described herein. When such methods and processes are implemented, the state of storage machines 22 and 32 may be transformed—e.g., to hold different data.

Storage machines 22 and 32 may include removable and/or built-in devices. Storage machines 22 and 32 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machines 22 and 32 may include volatile, nonvolatile, dynamic, static, read/write, read-only, random-access, sequential-access, location-addressable, file-addressable, and/or content-addressable devices.

It will be appreciated that storage machines 22 and 32 include one or more physical devices. However, aspects of the instructions described herein alternatively may be propagated by a communication medium (e.g., an electromagnetic signal, an optical signal, etc.) that is not held by a physical device for a finite duration.

Aspects of logic machines 18 and 28 and storage machines 22 and 32 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 10 implemented to perform a particular function. In some cases, a module, program, or engine may be instantiated via logic machines 18 and 28 executing instructions held by storage machines 22 and 32. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 70 may be used to present a visual representation of data held by storage machines 22 and 32. This visual representation may take the form of a graphical user interface (GUI). As the herein described methods and processes change the data held by the storage machine, and thus transform the state of the storage machine, the state of display subsystem 70 may likewise be transformed to visually represent changes in the underlying data. Display subsystem 70 may include one or more display devices utilizing virtually any type of technology. Such display devices may be combined with logic machines 18 and 28 and/or storage machines 22 and 32 in a shared enclosure, or such display devices may be peripheral display devices.

When included, input subsystem 24 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Claim Support Section

The subject matter of the present disclosure is further described in the following paragraphs. One aspect provides a server device for use in predictive rendering of scenes for a client device, comprising a processor, and a storage device holding instructions for a server application program executable by the processor to: receive, at the server application program, a current user navigation input in a stream of user navigation inputs from a client device over a network, calculate a predicted future navigation input based on the current user navigation input and a current application state of the server application program, render a future scene based on the predicted future navigation input to a rendering surface, and send the rendering surface to the client device over the network. The server device may additionally or alternatively include wherein the future scene is rendered with a larger field of view than a viewport of a client application program executed on the client device. The server device may additionally or alternatively include wherein the rendering surface is a cubemap. The server device may additionally or alternatively include wherein the rendering surface has fewer rendering planes than a cubemap. The server device may additionally or alternatively include wherein the rendering surface is a clipped cubemap. The server device may additionally or alternatively include wherein a percentage of clipping of the clipped cubemap is determined based on an expected variance of a prediction error of the predicted future navigation input. The server device may additionally or alternatively include wherein the rendering surface is an edge. The server device may additionally or alternatively include wherein the rendering surface is a tetrahedron. The server device may additionally or alternatively include the storage device holding further instructions for the server application program, executable by the logic machine to: determine, based on the current application state of the server application program, a plurality of alternative impulse input sequences for different permutations of impulse inputs that can occur within a communication lag time between the server device and client device, render a plurality of future scenes based on each of the alternative impulse input sequences and the predicted future navigation input to a plurality of rendering surfaces, and send the plurality of alternative impulse input sequences and the plurality of rendered rendering surfaces to the client device over the network. The server device may additionally or alternatively include wherein an impulse input is only determined to occur at a subsampling periodicity that is greater than one clock tick of the server application program.

Another aspect provides a method for predicting user input and rendering a future scene of an application comprising, at a server device: receiving, at a server application program executed on the server device, a current user navigation input in a stream of user navigation inputs from a client device, over a network, calculating a predicted future navigation input based on the current user navigation input and a current application state of the server application program, rendering a future scene based on the predicted future navigation input to a rendering surface, and sending the rendering surface to the client device over the network. The method may additionally or alternatively include wherein the future scene is rendered with a larger field of view than a viewport of a client application program executed on the client device. The method may additionally or alternatively include wherein the rendering surface is a clipped cubemap. The method may additionally or alternatively include wherein a percentage of clipping of the clipped cubemap is determined based on an expected variance of a prediction error of the predicted future navigation input. The method may additionally or alternatively include wherein the rendering surface is an edge. The method may additionally or alternatively include wherein the rendering surface is a tetrahedron. The method may additionally or alternatively include determining, based on the current application state of the server application program, a plurality of alternative impulse input sequences for different permutations of impulse inputs that can occur within a communication lag time between the server device and client device, rendering a plurality of future scenes based on each of the alternative impulse input sequences and the predicted future navigation input to a plurality of rendering surfaces, and sending the plurality of alternative impulse input sequences and the plurality of rendered rendering surfaces to the client device over the network. The method may additionally or alternatively include wherein an impulse input is only determined to occur at a subsampling periodicity that is greater than one clock tick of the server application program.

Another aspect provides a server device, comprising a processor and a storage device holding instructions for a server application program, executable by the processor to: receive, at the server application program, a current user navigation input in a stream of user navigation inputs from a client device over a network, calculate a predicted future navigation input based on the current user navigation input and a current application state of the server application program, determine, based on the current application state of the server application program, a plurality of alternative impulse input sequences for different permutations of impulse inputs that can occur within a communication lag time between the server device and client device, render a plurality of future scenes based on each of the alternative impulse input sequences and the predicted future navigation input to a plurality of rendering surfaces, wherein the plurality of future scenes are rendered with a larger field of view than a viewport of the client device, and send the plurality of alternative impulse input sequences and the plurality of rendered rendering surfaces to the client device over the network. The server device may additionally or alternatively include wherein the plurality of rendering surfaces are selected from the group consisting of: a cubemap, a clipped cubemap, an edge, and a tetrahedron.

The invention claimed is:

1. A cloud platform, comprising:
 a processor; and
 a storage device holding instructions for a cloud server program executable by the processor to:
  receive, at the cloud server program, a current user game input in a stream of user game inputs from a client device over a network;
  calculate a predicted future game input based on the current user game input and a current application state of the cloud server program;
  determine, based on the current application state of the cloud server program, a plurality of alternative impulse input sequences for different permutations of impulse inputs that can occur within a communication lag time between the cloud platform and client device;
  generate a plurality of future game spaces based on each of the alternative impulse input sequences and the predicted future game input; and
  send the plurality of alternative impulse input sequences and the plurality of future game spaces to the client device over the network.

2. The cloud platform of claim 1, wherein the plurality of future game spaces are rendered with a larger field of view than a viewport of a client application program executed on the client device.

3. The cloud platform of claim 2, wherein the plurality of future game spaces are rendered to a plurality of rendering surfaces, and wherein one or more of the plurality of rendering surfaces is a cubemap.

4. The cloud platform of claim 2, wherein the plurality of future game spaces are rendered to a plurality of rendering surfaces, and wherein one or more of the plurality of rendering surfaces have fewer rendering planes than a cubemap.

5. The cloud platform of claim 4, wherein the one or more of the plurality of rendering surfaces is a clipped cubemap.

6. The cloud platform of claim 5, wherein a percentage of clipping of the clipped cubemap is determined based on an expected variance of a prediction error of the predicted future game input.

7. The cloud platform of claim 4, wherein the one or more of the plurality of rendering surfaces is an edge.

8. The cloud platform of claim 4, wherein the one or more of the plurality of rendering surfaces is a tetrahedron.

9. The cloud platform of claim 1, wherein the stream of user game inputs and the predicated future game input include navigation inputs.

10. The cloud platform of claim 1, wherein an impulse input is only determined to occur at a subsampling periodicity that is greater than one clock tick of the cloud server program.

11. A method comprising:
at a server device:
- receiving, at a cloud server program executed on the server device, a current user game input in a stream of user game inputs from a client device, over a network;
- calculating a predicted future game input based on the current user game input and a current application state of the cloud server program;
- determining, based on the current application state of the cloud server program, a plurality of alternative impulse input sequences for different permutations of impulse inputs that can occur within a communication lag time between the server device and client device;
- generating a plurality of future game spaces based on each of the alternative impulse input sequences and the predicted future game input; and
- sending the plurality of alternative impulse input sequences and the plurality of future game spaces to the client device over the network.

12. The method of claim 11, wherein the plurality of future game spaces are rendered with a larger field of view than a viewport of a client application program executed on the client device.

13. The method of claim 12, wherein the plurality of future game spaces are rendered to a plurality of rendering surfaces, and wherein one or more of the plurality of rendering surfaces is a clipped cubemap.

14. The method of claim 13, wherein a percentage of clipping of the clipped cubemap is determined based on an expected variance of a prediction error of the predicted future game input.

15. The method of claim 12, wherein the plurality of future game spaces are rendered to a plurality of rendering surfaces, and wherein one or more of the plurality of rendering surfaces is an edge.

16. The method of claim 12, wherein the plurality of future game spaces are rendered to a plurality of rendering surfaces, and wherein one or more of the plurality of rendering surfaces is a tetrahedron.

17. The method of claim 11, wherein the stream of user game inputs and the predicated future game input include navigation inputs.

18. The method of claim 11, wherein an impulse input is only determined to occur at a subsampling periodicity that is greater than one clock tick of the server application program.

19. A server device, comprising:
a processor; and
a storage device holding instructions for a cloud server program, executable by the processor to:
- receive, at the cloud server program, a current user game input in a stream of user game inputs from a client device over a network;
- calculate a predicted future game input based on the current user game input and a current application state of the cloud server program, the predicated future game input including a plurality of alternative game input sequences for different permutations of game inputs that can occur within a communication lag time between the server device and client device;
- generate a plurality of future game spaces based on predicted future game input including each of the alternative game input sequences; and
- send the plurality of future game spaces to the client device over the network.

20. The server device of claim 19, wherein the service is included in a plurality of server devices of a cloud platform configured to serve predicatively generated game spaces for a game application to one or more thin client devices.

* * * * *